US012649521B2

(12) United States Patent
Takaki et al.

(10) Patent No.: US 12,649,521 B2
(45) Date of Patent: Jun. 9, 2026

(54) ELECTRIC TRACTOR

(71) Applicant: KUBOTA CORPORATION, Osaka (JP)

(72) Inventors: Go Takaki, Osaka (JP); Shinichi Kawabata, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 374 days.

(21) Appl. No.: 18/126,636

(22) Filed: Mar. 27, 2023

(65) Prior Publication Data

US 2023/0227106 A1     Jul. 20, 2023

Related U.S. Application Data

(63) Continuation of application No. PCT/JP2021/036369, filed on Oct. 1, 2021.

(30) Foreign Application Priority Data

Oct. 5, 2020    (JP) ................................. 2020-168258
Oct. 5, 2020    (JP) ................................. 2020-168259

(51) Int. Cl.
    *B62D 21/02*    (2006.01)
    *B60K 1/04*    (2019.01)
    (Continued)

(52) U.S. Cl.
    CPC ................ *B62D 21/02* (2013.01); *B60K 1/04* (2013.01); *B60L 50/66* (2019.02); *B60L 53/16* (2019.02);
    (Continued)

(58) Field of Classification Search
    CPC ................. B60L 53/16; B60L 2200/40; B60K 2001/0411; B60Y 2200/221; Y02T 90/14
    See application file for complete search history.

(56) References Cited

U.S. PATENT DOCUMENTS

2011/0046831 A1 * 2/2011 Ananthakrishna .... B60W 20/00
    180/65.265
2014/0339007 A1 * 11/2014 Miyashiro ............... B60L 50/52
    180/220

(Continued)

FOREIGN PATENT DOCUMENTS

JP      2002-167181 A    6/2002
JP      2004-242474 A    8/2004

(Continued)

OTHER PUBLICATIONS

Office Action issued Sep. 5, 2023 in Japanese family application No. 2020-168258 and English language translation thereof.

(Continued)

*Primary Examiner* — Erez Gurari
(74) *Attorney, Agent, or Firm* — Greenblum & Bernstein, P.L.C.

(57) ABSTRACT

An electric tractor includes an electric motor to drive a traveling device; a battery; an inverter to supply electric power from the battery to the electric motor; a vehicle body frame located below a hood located forward of an operator's seat to cover the battery; and a support frame attached to the vehicle body frame, wherein the support frame includes a battery support to support the battery located at a position above the electric motor and above the vehicle body frame, and an inverter support to support the inverter located at a position between the battery support and the vehicle body frame and forward of the electric motor.

7 Claims, 20 Drawing Sheets

(51) Int. Cl.
    *B60L 50/60*           (2019.01)
    *B60L 53/16*           (2019.01)
    *B62D 49/00*           (2006.01)

(52) U.S. Cl.
    CPC ...... *B62D 49/00* (2013.01); *B60K 2001/0411*
        (2013.01); *B60L 2200/40* (2013.01); *B60L*
                          *2210/40* (2013.01)

(56)               References Cited

U.S. PATENT DOCUMENTS

| | | | | |
|---|---|---|---|---|
| 2014/0345962 | A1* | 11/2014 | Miyashiro | B62M 7/12 |
| | | | | 180/220 |
| 2017/0113562 | A1* | 4/2017 | Kato | B60L 53/16 |
| 2018/0178631 | A1 | 6/2018 | Yamamoto et al. | |
| 2023/0024960 | A1* | 1/2023 | Wada | H01M 10/6563 |
| 2023/0026390 | A1* | 1/2023 | Ogawa | B62J 43/16 |
| 2023/0122499 | A1* | 4/2023 | Holeton | B60L 58/20 |
| | | | | 320/109 |
| 2023/0135028 | A1* | 5/2023 | Eggers | B60L 53/22 |
| | | | | 320/109 |
| 2023/0166805 | A1* | 6/2023 | Jin | B62J 6/16 |
| | | | | 180/220 |
| 2023/0227106 | A1* | 7/2023 | Takaki | B62D 21/02 |
| | | | | 180/65.1 |
| 2023/0284560 | A1* | 9/2023 | Dai | A01D 34/6818 |
| 2023/0322339 | A1* | 10/2023 | Bouthillier | B63B 59/00 |
| | | | | 52/3 |
| 2023/0415567 | A1* | 12/2023 | Okamoto | H01H 27/06 |
| 2025/0125442 | A1* | 4/2025 | Nadiadi | H01M 10/625 |
| 2025/0135923 | A1* | 5/2025 | Nadiadi | B62D 25/12 |
| 2025/0140959 | A1* | 5/2025 | Anattasakul | H01M 10/625 |

FOREIGN PATENT DOCUMENTS

| | | | |
|---|---|---|---|
| JP | 2010-260695 | A | 11/2010 |
| JP | 2013-068177 | A | 4/2013 |
| JP | 62-07795 | B | 10/2017 |
| JP | 6-471626 | B2 | 2/2019 |
| KR | 1020130040286 | A | 4/2013 |
| WO | 2019/048921 | A1 | 3/2019 |

OTHER PUBLICATIONS

Notification of Reasons for Rejection dated Jan. 9, 2024 in corresponding Japanese family member Patent Application No. 2020-168259 with English language translation thereof.

* cited by examiner

ELECTRIC TRACTOR

CROSS REFERENCE TO RELATED APPLICATIONS

This application is a continuation application of International Application No. PCT/JP2021/036369 filed on Oct. 1, 2021, which claims the benefit of priority to Japanese Patent Application No. 2020-168258, filed on Oct. 5, 2020, and to Japanese Patent Application No. 2020-168259, filed on Oct. 5, 2020. The entire contents of each of these applications are hereby incorporated herein by reference.

BACKGROUND OF THE INVENTION

1. Field of the Invention

The present invention relates to an electric tractor.

2. Description of the Related Art

The electric tractors disclosed in Japanese Patent No. 6471626 and Japanese Unexamined Patent Application Publication No. 2013-68177 are known.

The electric tractor disclosed in Japanese Patent No. 6471626 is a tractor in which a traveling device supporting a vehicle body so as to be able to travel is driven by an electric motor. The electric tractor is provided with a battery that supplies electric power to the electric motor, and an inverter that converts direct-current power from the battery into alternating-current power and supplies the alternating-current power to the electric motor.

The electric tractor disclosed in Japanese Unexamined Patent Application Publication No. 2013-68177 is provided with a battery that supplies electric power to an electric motor, and a charging connector for charging the battery. The battery can be charged by connecting a power supplying connector that is provided on an external power supply system to the charging connector.

SUMMARY OF THE INVENTION

There is a concern that, since large current flows through a wire that connects an electric motor and an inverter, heat is generated and efficiency decreases due to a loss in an electric wire when the length of the wiring is long (see Japanese Patent No. 6471626). Therefore, it is important to couple the electric motor and the inverter through a path that is as short as possible.

In the electric tractor disclosed in Japanese Unexamined Patent Application Publication No. 2013-68177, the charging connector is provided behind a cylinder holder including a key cylinder for insertion of a starter key. Charging of the battery is thus burdensome.

Preferred embodiments of the present invention provide electric tractors in which an electric motor and an inverter can be coupled by a short path.

Preferred embodiments of the present invention provide electric tractors in which an operator portion is provided with a charging connector and in which a battery can be easily charged.

An electric tractor according to an aspect of the present invention includes an electric motor to drive a traveling device, a battery, an inverter to supply electric power from the battery to the electric motor, a vehicle body frame located below a hood located forward of an operator's seat to cover the battery, and a support frame attached to the vehicle body frame, wherein the support frame includes a battery support to support the battery located at a position above the electric motor and above the vehicle body frame, and an inverter support to support the inverter located at a position between the battery support and the vehicle body frame and forward of the electric motor.

The battery support may include a placement plate for placement of the battery, and a mounting bracket protruding downward from the placement plate. The inverter support may include a supporting plate for placement of the inverter, the supporting plate being located below the placement plate with a space interposed between the supporting plate and the placement plate and being attached to the vehicle body frame, and a support stay which protrudes upward from the supporting plate and to which the mounting bracket is attached.

The inverter support may support the inverter such that the inverter is positioned to overlap the electric motor when viewed in a front-rear direction.

The support frame may include a support portion located below a rear portion of the placement plate, the support portion being fixed to the vehicle body frame to support the rear portion of the placement plate. The inverter support may support a front portion of the placement plate.

The support portion may include a support plate for placement of the rear portion of the placement plate, the support plate being located above the electric motor, and a support leg provided on the same side of the support plate as a lower surface of the support plate and fixed to the vehicle body frame.

The electric motor may include a motor's connector provided on a front portion of the electric motor. The inverter may include an inverter's connecter connected to the motor's connector, the inverter's connector being located forward of the motor's connector.

The motor's connector may be provided on a front lower portion of the electric motor. The inverter may be positioned such that an inverter body thereof placed and supported on the inverter support is located forward of an upper portion of the electric motor and the inverter body overlaps the upper portion of the electric motor when viewed in a front-rear direction. The inverter's connector may be provided on a lower portion of the inverter body and protrudes downward from the inverter support.

The inverter support may have a cutout that allows the inverter's connector to protrude downward from the inverter support.

The vehicle body frame may include a first side plate and a second side plate that are arranged with a space therebetween in a vehicle width direction. The motor's connector and the inverter's connector may be located between the first side plate and the second side plate.

An electric tractor according to another aspect of the present invention includes an operator portion including an operator's seat and a steering portion provided in the vicinity of the operator's seat, a vehicle body on which the operator portion is provided, a traveling device to support the vehicle body such that the traveling device is allowed to travel, an electric motor to drive the traveling device, a battery to supply electric power to the electric motor, and a charging connector for charging of the battery, wherein the steering portion includes an operation member and a cover body to cover a lower portion of the operation member, and the charging connector is located outside the cover body to be exposed outward of the steering portion.

The charging connector may be located at a side of the cover body such that the charging connector is oriented outward in a vehicle width direction.

The steering portion may include a steering operation member that is located forward of the operator's seat to function as the operation member, and a front cover that covers a lower portion of the steering operation member to function as the cover body, and the charging connector is located on an upper portion of an outer surface of the front cover.

The steering operation member may include a steering handle, and the charging connector is located forward of the steering handle.

The charging connector may be located on the outer surface of the front cover such that a height position of the charging connector is substantially the same as a height position of a seat portion of the operator's seat.

The electric tractor may include a connector bracket to which the charging connector is attached. The connector bracket may include a connector mounting portion to which the charging connector is attached outside the front cover, and a mounting wall portion attached to a mounting portion provided inside of the front cover.

The connector bracket may include a mirror mounting portion to which a side mirror is attached.

The connector bracket may include a lamp mounting portion to which an indicator lamp is attached.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
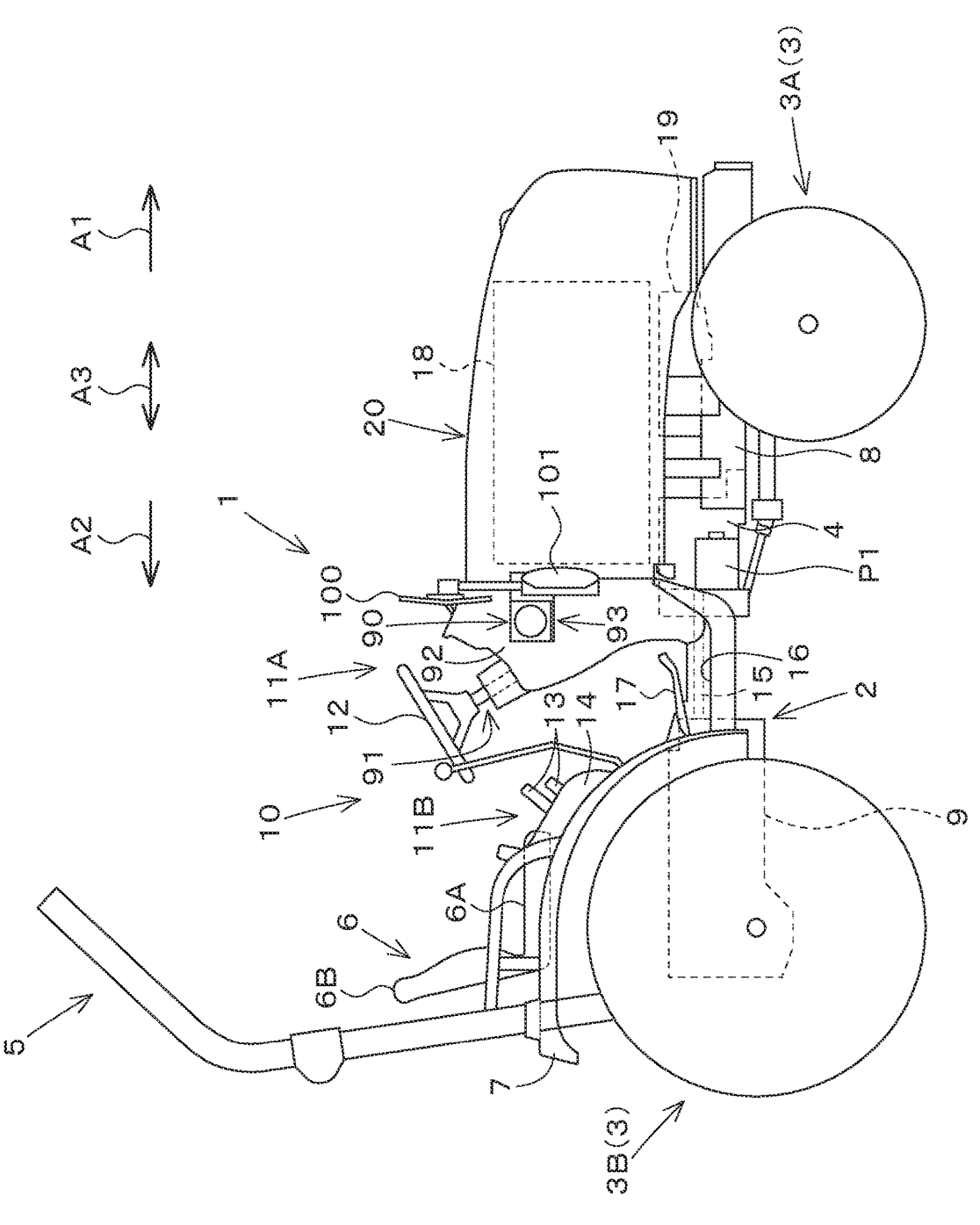
FIG. 1 is a schematic side view of an electric tractor.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinafter, one embodiment according to the present invention will be described with reference to the drawings, as appropriate.

Figure 2:
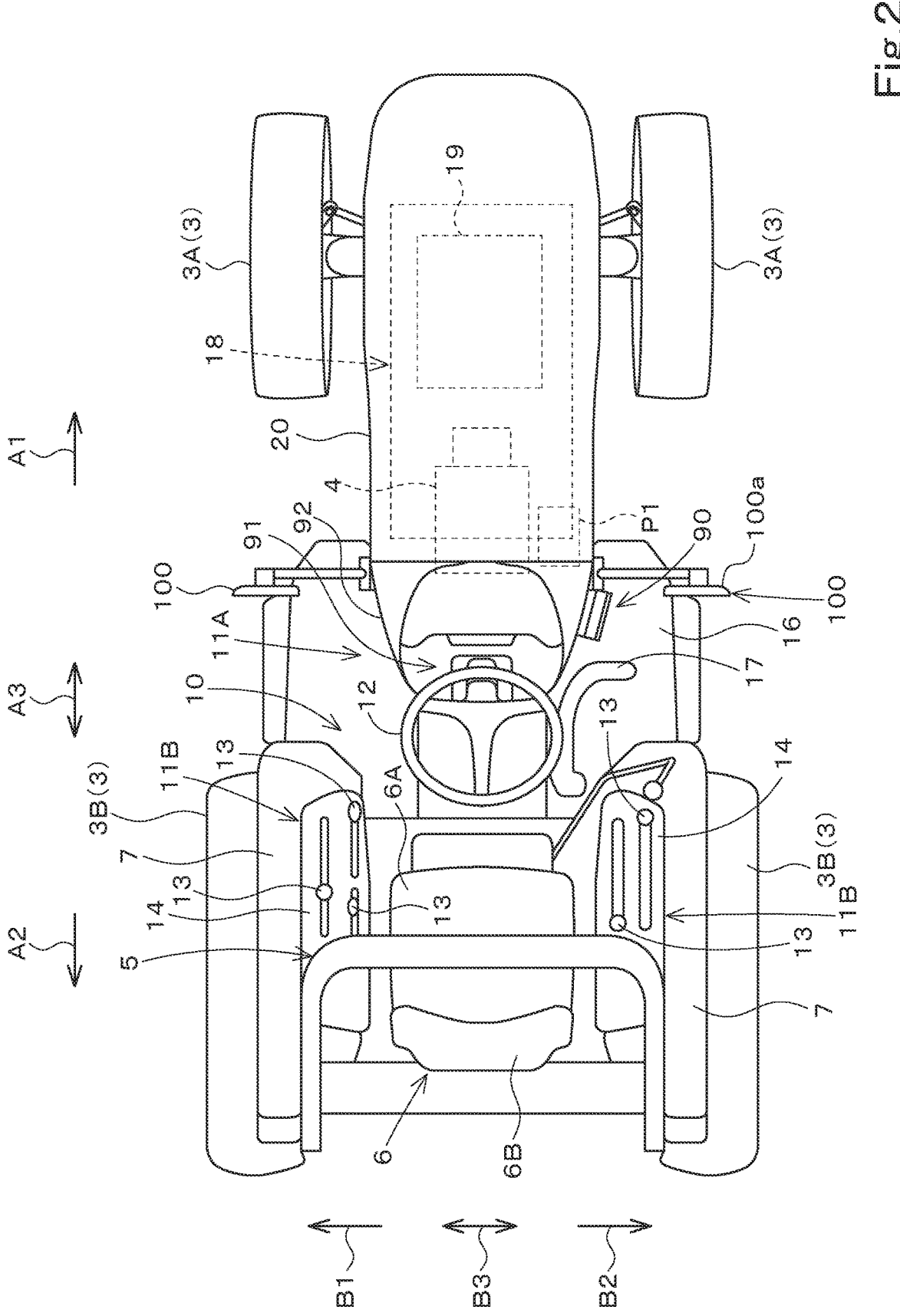
FIG. 2 is a schematic plan view of an electric tractor.

FIG. 1 is a schematic side view illustrating an overall configuration of an electric tractor 1 according to the present embodiment. FIG. 2 is a schematic plan view of the electric tractor 1. The electric tractor 1 is a tractor in which a traveling device 3 that supports a vehicle body 2 such that the vehicle body 2 is allowed to travel is driven by an electric motor 4.

In the present embodiment, the direction of arrow A1 (the direction of forward travel of the electric tractor 1) in FIG. 1 and FIG. 2 will be referred to as forward, the direction of arrow A2 (the direction of rearward travel of the electric tractor 1) in FIG. 1 and FIG. 2 will be referred to as rearward, and the direction of arrow A3 in FIG. 1 and FIG. 2 will be referred to as a front-rear direction. Accordingly, the far side (the side indicated by arrow B1 in FIG. 2) in FIG. 1 is the left side, and the near side (the side indicated by arrow B2 in FIG. 2) in FIG. 1 is the right side. The direction of arrow B3 in FIG. 2 will be referred to as the vehicle width direction (width direction of the electric tractor 1). A direction toward the left side or the right side from a widthwise central portion of the electric tractor 1 along the vehicle width direction will be referred to as an outward widthwise direction. In other words, the outward widthwise direction is a direction away from the center of the electric tractor 1 in the vehicle width direction. A direction opposite the outward widthwise direction will be referred as an inward widthwise direction. In other words, the inward widthwise direction is a direction toward the center of the electric tractor 1 in the vehicle width direction.

As illustrated in FIG. 1 and FIG. 2, the electric tractor 1 includes a rollover protective structure (ROPS) 5 as an operator protector. In other words, the electric tractor 1 is of a type without a cabin surrounding an operator's seat 6.

As illustrated in FIG. 1 and FIG. 2, the electric tractor 1 includes the vehicle body 2 which is supported by the traveling device 3 such that the vehicle body 2 is allowed to travel. The traveling device 3 includes left and right front wheels 3A located at a front portion of the electric tractor 1, and left and right rear wheels 3B located at a rear portion of the electric tractor 1. The front wheels 3A are steerable wheels (steered wheels). The rear wheels 3B are each covered by a fender 7. The traveling device 3 is not limited to a traveling device 3 of a wheel type and may be a traveling device 3 of a crawler type.

As illustrated in FIG. 1, the vehicle body 2 includes the electric motor 4, a vehicle body frame 8, and a transmission case 9. The electric motor 4 is a power source that drives the traveling device 3. The electric motor 4 is located at a position forward of the operator's seat 6 and a front steering portion 11A (described later) and at a central portion of the electric tractor 1 in the vehicle width direction. The vehicle body frame 8 protrudes forward from the electric motor 4 and is supported by the left and right front wheels 3A. The transmission case 9 is located rearward of the electric motor 4 with a space therebetween and is supported by the left and right rear wheels 3B. The transmission case 9 includes, for example, a transmission case, a differential case, and/or the like. The transmission case 9 houses therein a transmission that speed-changes rotational power transmitted from the electric motor 4 through a transmission shaft 15, a transmission mechanism that transmits the power that has been speed-changed by the transmission to the rear wheels 3B, a power takeoff mechanism that takes out the speed-changed power to transmit the power to the front wheels 3A, and/or the like. The electric motor 4, the vehicle body frame 8, and the transmission case 9 are coupled to each other by a coupling frame (not illustrated).

A rear portion of the transmission case 9 is provided with a mounting mechanism (not illustrated) such as a three-point linkage mechanism to which a working machine is to be detachably coupled, and a hydraulic mechanism that raises and lowers the mounting mechanism (working machine).

An operator portion 10 including the operator's seat 6 and its surroundings is mounted on the vehicle body 2. The periphery of the operator portion 10 is open. The operator's seat 6 is located above the transmission case 9 and is supported by the transmission case 9. The operator's seat 6 includes a seat portion 6A for an operator to sit, and a backrest 6B that protrudes upward from a rear portion of the seat portion 6A and supports the back of the operator. The operator portion 10 includes a steering portion (front steering portion) 11A located forward of the operator's seat 6, and steering portions (side steering portions) 11B located leftward and rightward of the operator's seat 6.

The front steering portion 11A includes a steering handle 12 for steering operation of the left and right front wheels 3A. The side steering portions 11B each include an operation lever (operation member) 13 and a cover body 14 covering a lower portion of the operation lever 13. The operation lever 13 is, for example, an auxiliary transmission lever for changing speed stages of an auxiliary transmission mechanism of the transmission, a PTO lever for operating a PTO shaft that transmits power to a working machine mounted rearward of the electric tractor 1, a position lever for setting the position of the working machine in the up-down direction, an auxiliary control lever for operating the working machine, and/or the like.

A floor 16 on which the feet of an operator are to be placed is provided at a position forward of and lower than the operator's seat 6. At a right portion of the floor 16, there is a speed change pedal 17 for changing speed stages of the traveling device 3.

As illustrated in FIG. 1 and FIG. 2, the electric tractor 1 includes a battery 18 that supplies electric power to the electric motor 4, and an inverter 19 that converts direct-current power from the battery 18 into alternating-current power and supplies the alternating-current power to the electric motor 4. The battery 18 is a battery 18 for traveling.

6

Figure 4:
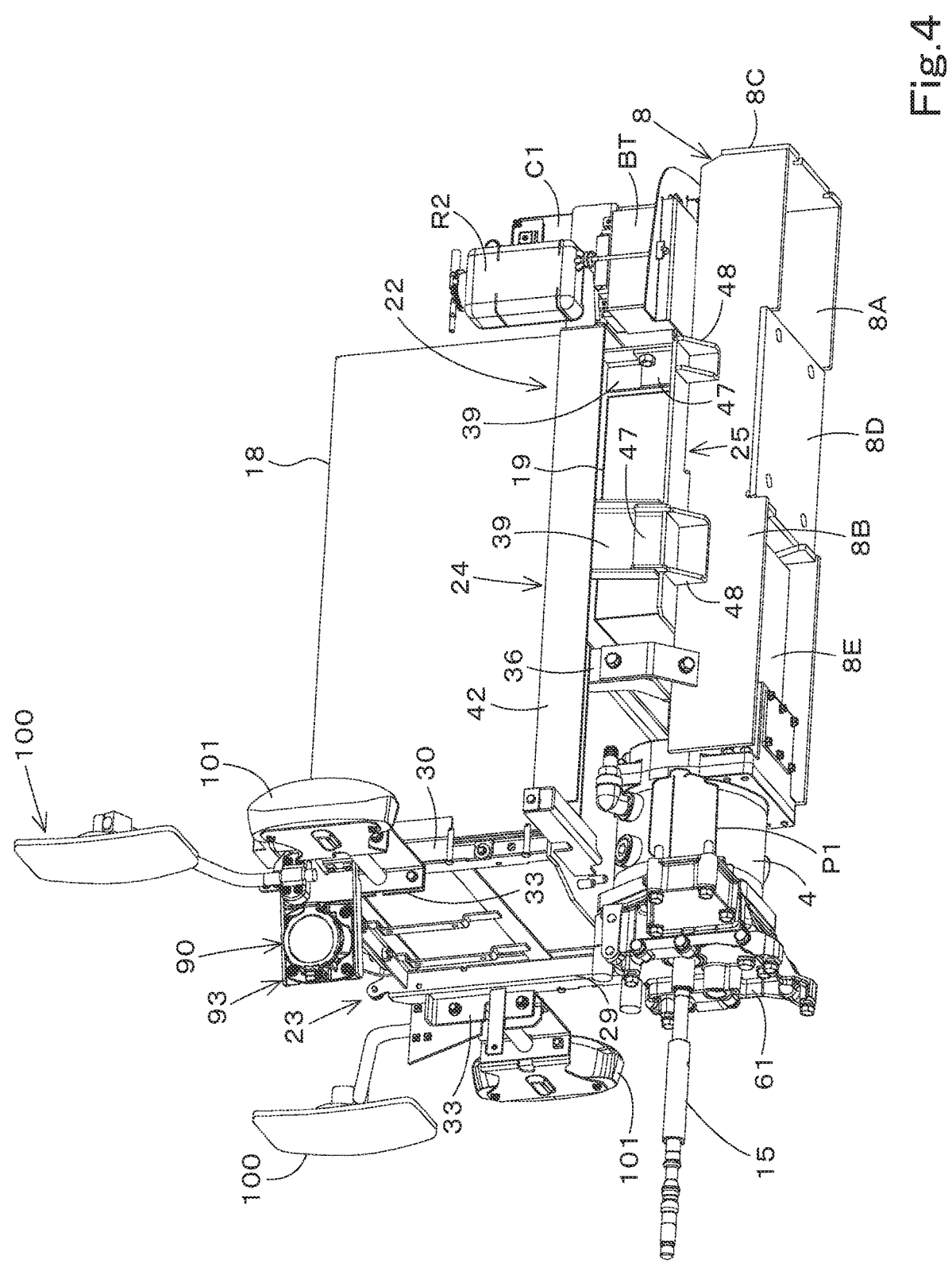
FIG. 4 is a perspective view illustrating configurations of a battery support and an inverter support.

As illustrated in FIG. 1 and FIG. 4, the battery 18 is located at a position above the electric motor 4 and above the vehicle body frame 8. In detail, the battery 18 is located at a position above the electric motor 4 and the vehicle body frame 8 to overlap the electric motor 4 and the vehicle body frame 8 when viewed in the up-down direction (in plan view). The battery 18 is covered by an openable and closable hood 20 located forward of the operator's seat 6. The vehicle body frame 8 is located below the hood 20.

Figure 3:
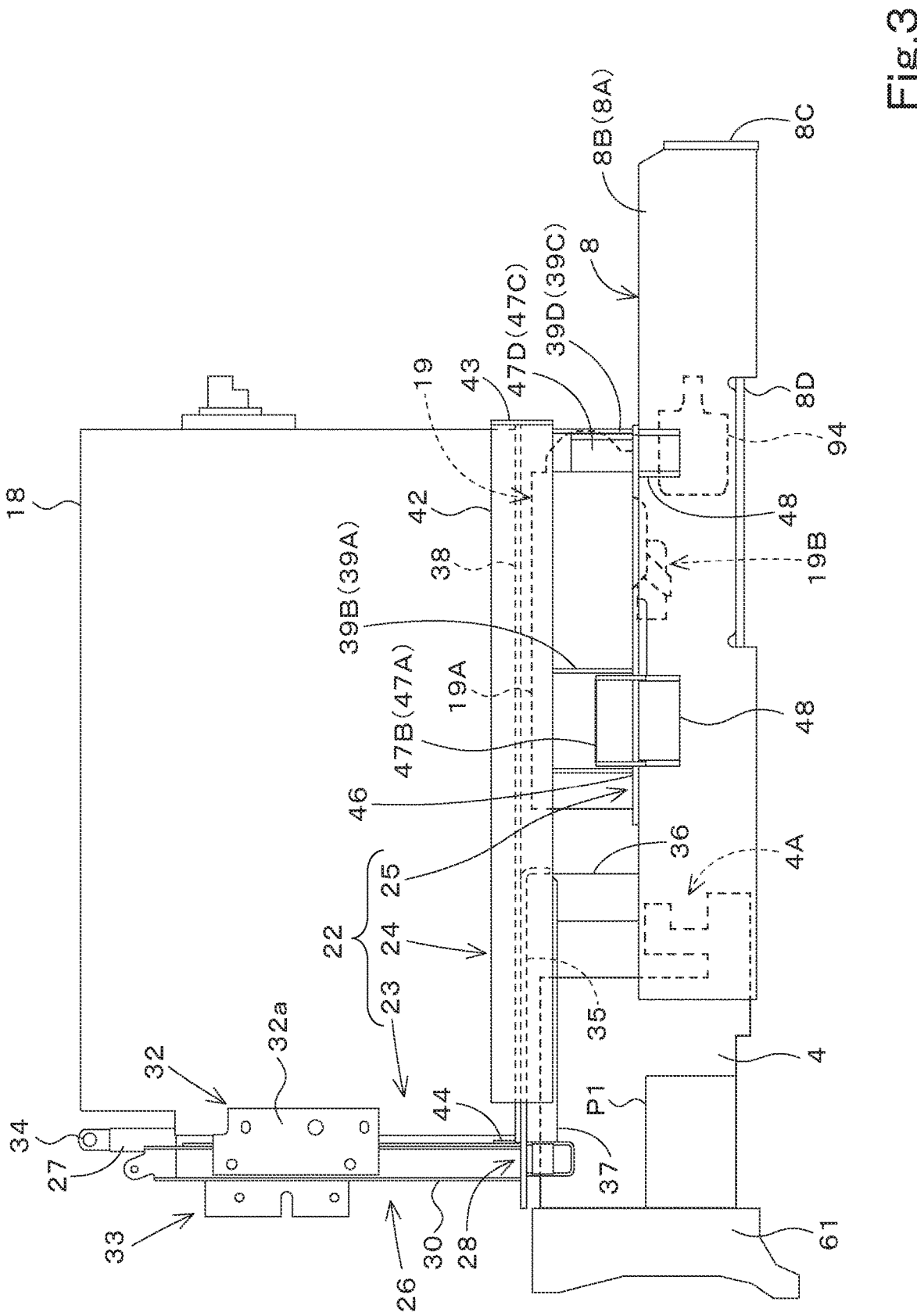
FIG. 3 is a side view illustrating configurations of a battery support and an inverter support.

As illustrated in FIG. 2, the electric motor 4 is located below a rear portion of the battery 18, and a rear portion of the electric motor 4 protrudes rearward from the battery 18. As illustrated in FIG. 3, a front portion of the electric motor 4 is provided with a connector (motor's connector) 4A. In the present embodiment, the motor's connector 4A is a three-phase connector. The motor's connector 4A is provided on a front lower portion (a lower portion of the front surface) of the electric motor 4.

As illustrated in FIG. 3, the inverter 19 is located at a position between the battery 18 (later-described battery support 24) and the vehicle body frame 8 and forward of the electric motor 4. The inverter 19 is positioned to overlap the electric motor 4 when viewed in the front-rear direction. In detail, the inverter 19 is positioned such that an inverter body 19A thereof overlaps an upper portion of the electric motor 4 when viewed in the front-rear direction. The inverter 19 is located at a position below a front portion of the battery 18 to overlap the battery 18 when viewed in the up-down direction. A lower portion of the inverter 19 is provided with a connector (inverter's connector) 19B that is connected to the motor's connector 4A by a wire (three-phase wire, see FIG. 12) 21. In the present embodiment, the inverter's connector 19B is a three-phase connector. The inverter's connector 19B is provided at a lower surface of a rear portion of the inverter 19 and protrudes downward from the inverter body 19A.

Figure 5:
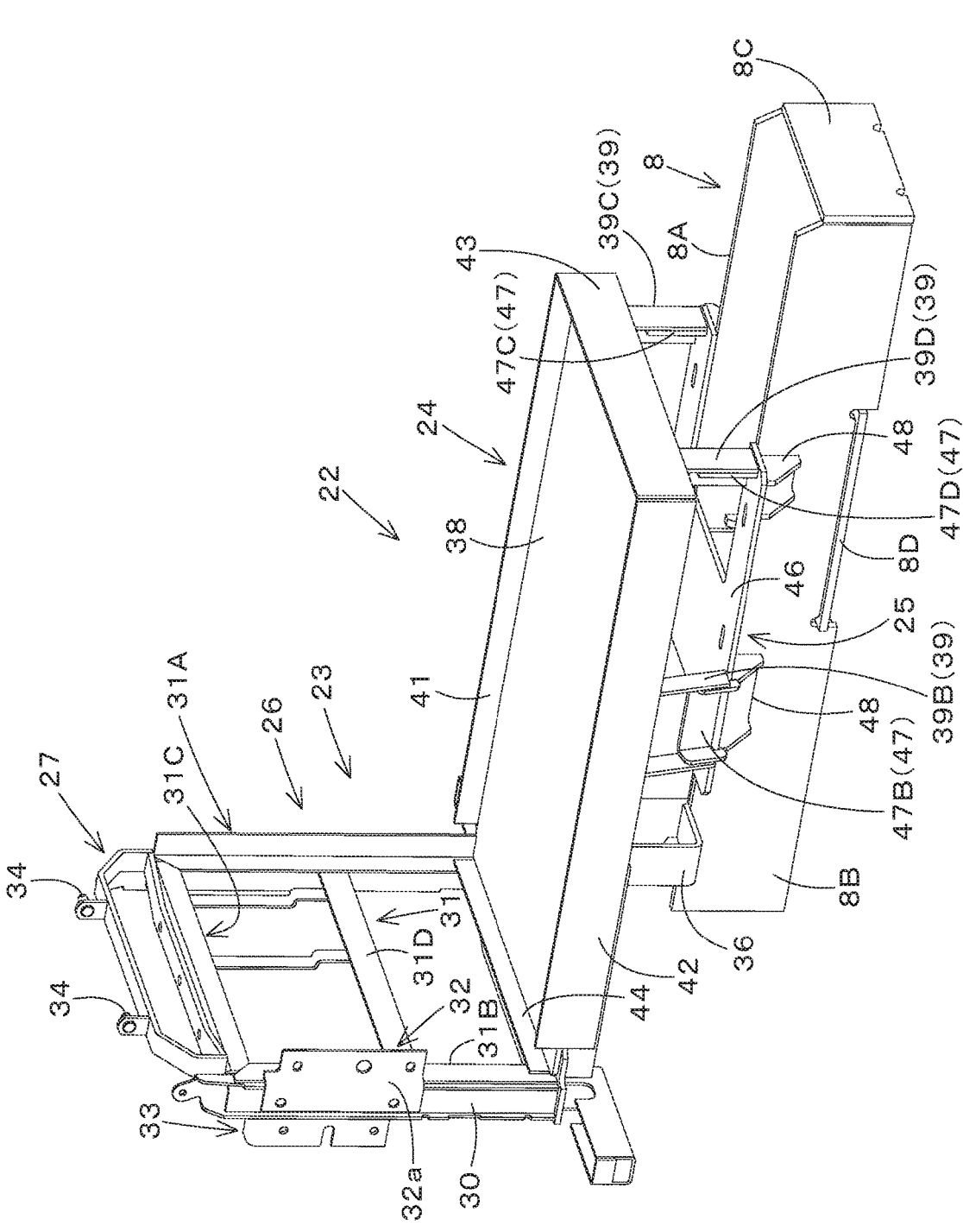
FIG. 5 is a perspective view of a vehicle body frame and a support frame.

As illustrated in FIG. 3, FIG. 4, and FIG. 5, the electric tractor 1 includes a support frame 22 attached to the vehicle body frame 8. The battery 18 and the inverter 19 are attached to and supported on the support frame 22.

Figure 6:
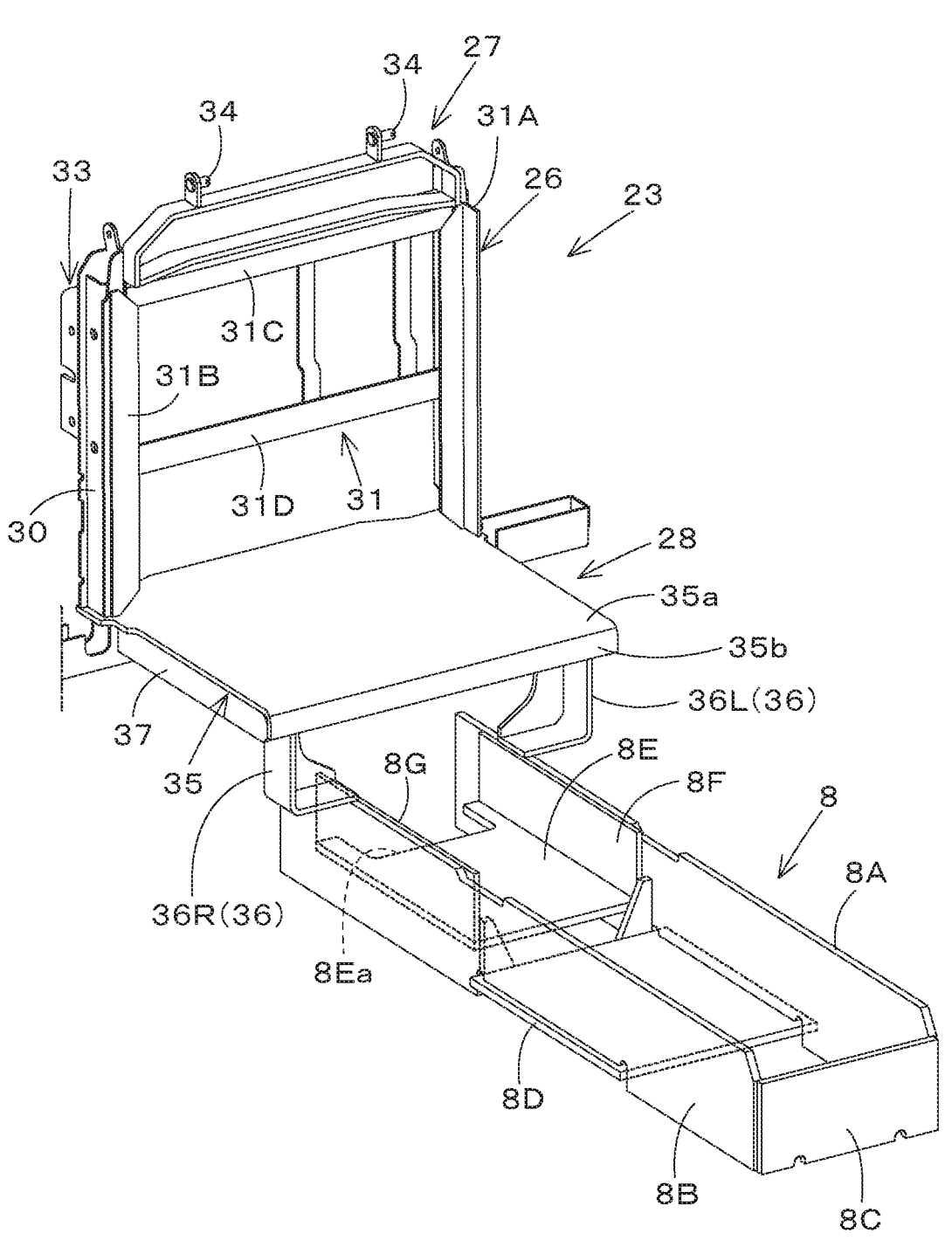
FIG. 6 is a perspective view of a vehicle body frame and a rear frame.

As illustrated in FIG. 6, the vehicle body frame 8 includes, mainly, a first side plate 8A, a second side plate 8B, and a front plate 8C. The first side plate 8A and the second side plate 8B are arranged such that plate surfaces thereof face in the vehicle width direction. The first side plate 8A and the second side plate 8B are arranged adjacent to each other with a space therebetween in the vehicle width direction.

As illustrated in FIG. 4, the first side plate 8A protrudes forward from one of the opposite sides of the electric motor 4 in the vehicle width direction. The second side plate 8B extends forward from the other of the opposite sides of the electric motor 4 in the vehicle width direction and faces the first side plate 8A in the vehicle width direction.

The front plate 8C is positioned such that plate surfaces thereof face in the front-rear direction and is fixed to front portions of the first side plate 8A and the second side plate 8B. In detail, the front plate 8C extends from the front end of the first side plate 8A to the front end of the second side plate 8B and couples the front ends of the first side plate 8A and the second side plate 8B to each other.

The vehicle body frame 8 includes coupling plates 8D and 8E and reinforcing plates 8F and 8G. The number of the coupling plates 8D and 8E is two or more, and the two or more coupling plates include a front coupling plate 8D and a rear coupling plate 8E. The front coupling plate 8D is positioned such that plate surfaces thereof face in the up-down direction, and couples the lower ends of front portions of the first side plate 8A and the second side plate 8B to each other at a position rearward of the front plate 8C. The rear coupling plate 8E is positioned such that plate surfaces thereof face in the up-down direction, and couples vertical intermediate portions of the first side plate 8A and the second side plate 8B to each other at a position rearward of the front coupling plate 8D. The rear coupling plate 8E has, in a rear portion thereof, a cutout 8Ea with an open rear to prevent interfere with the motor's connector 4A of the electric motor 4. The reinforcing plate 8F is located at one edge portion of the rear coupling plate 8E above the rear coupling plate 8E, and is fixed to the inner side of the first side plate 8A. The reinforcing plate 8G is located at the opposite edge portion of the rear coupling plate 8E above the rear coupling plate 8E, and is fixed to the inner side of the second side plate 8B.

As illustrated in FIG. 5, the support frame 22 includes a rear frame (frame member) 23, the battery support 24, and an inverter support 25.

Figure 7:
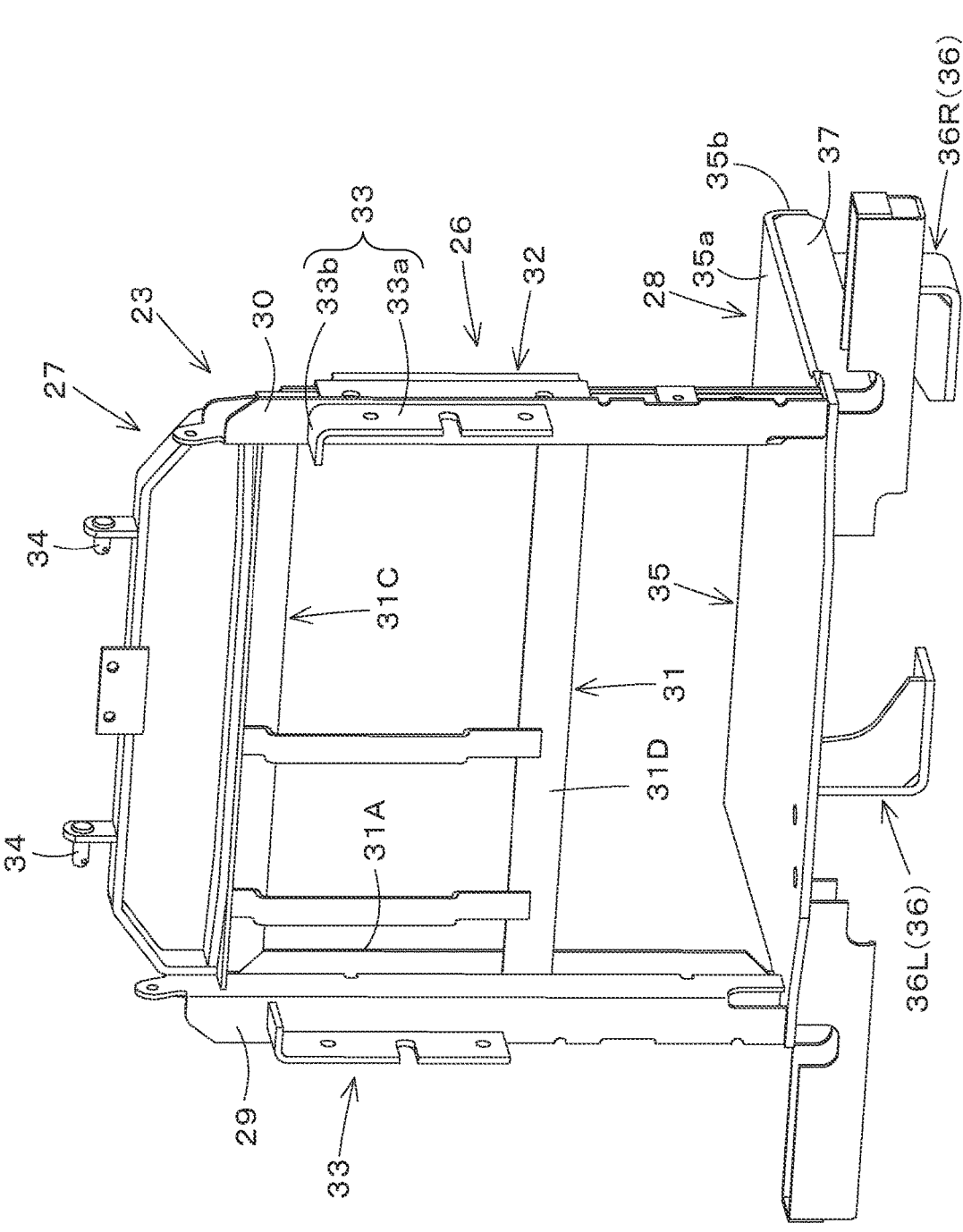
FIG. 7 is a perspective view of a back surface of a rear frame.

As illustrated in FIG. 6 and FIG. 7, the rear frame 23 includes a main frame 26, an upper frame 27, and a support portion 28.

The main frame 26 includes a first pillar member 29, a second pillar member 30, and a coupling frame body 31. The first pillar member 29 constitutes one of the opposite portions of the main frame 26 in the vehicle width direction. The second pillar member 30 constitutes the other of the opposite portions of the main frame 26 in the vehicle width direction. The coupling frame body 31 couples the first pillar member 29 and the second pillar member 30 to each other. The coupling frame body 31 includes a first vertical member 31A fixed to the front surface of the first pillar member 29, a second vertical member 31B fixed to the front surface of the second pillar member 30, a first lateral member 31C coupling upper portions of the first vertical member 31A and the second vertical member 31B to each other, and a second lateral member 31D coupling intermediate portions of the first vertical member 31A and the second vertical member 31B to each other. As illustrated in FIG. 5, a restriction plate 32 including a restriction portion 32a protruding forward from the second pillar member 30 is fixed to an upper portion of the second pillar member 30.

As illustrated in FIG. 7, mounting plate 33 are fixed to an upper portion of the rear surface of the first pillar member 29 and an upper portion of the rear surface of the second pillar member 30 so as to protrude rearward. Each of the mounting plates 33 includes a vertical plate portion 33a positioned such that plate surfaces thereof face in the vehicle width direction, and an extension plate portion 33b extending in the inward widthwise direction from the upper end of the vertical plate portion 33a.

As illustrated in FIG. 6 and FIG. 7, the upper frame 27 is attached to the first lateral member 31C. The upper frame 27 is provided with one or more support pins 34 each of which supports an upper portion of a rear portion of the hood 20 such that the hood 20 is rotatable about an axis extending in the vehicle width direction.

The support portion 28 includes a support plate 35 protruding forward from a lower portion of the main frame 26, and support leg(s) 36 provided on the same side of the support plate 35 as a lower surface of the support plate 35. The support plate 35 includes a main plate portion 35a positioned such that plate surfaces thereof face in the up-down direction, and an extension plate portion 35b extending downward from the front end of the main plate portion 35a. As illustrated in FIG. 3, the support plate 35 is located above the electric motor 4. The reinforcing plate(s) 37 are fixed to left and right portions of the lower surface of the main plate portion 35a, respectively. The support legs 36 are provided at a left portion and a right portion of the lower surface of a front portion of the support plate 35. The support legs 36 are fixed to the vehicle body frame 8. In detail, a support leg 36L on the left portion is fixed to the upper end of a rear portion of the first side plate 8A, and a support leg 36R on the right portion is fixed to the upper end of a rear portion of the second side plate 8B.

Note that a rear portion of the support portion 28 (support plate 35) is supported by the vehicle body 2 via support member(s).

Figure 8:
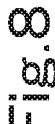
FIG. 8 is a top perspective view of a battery support.
Figure 9:
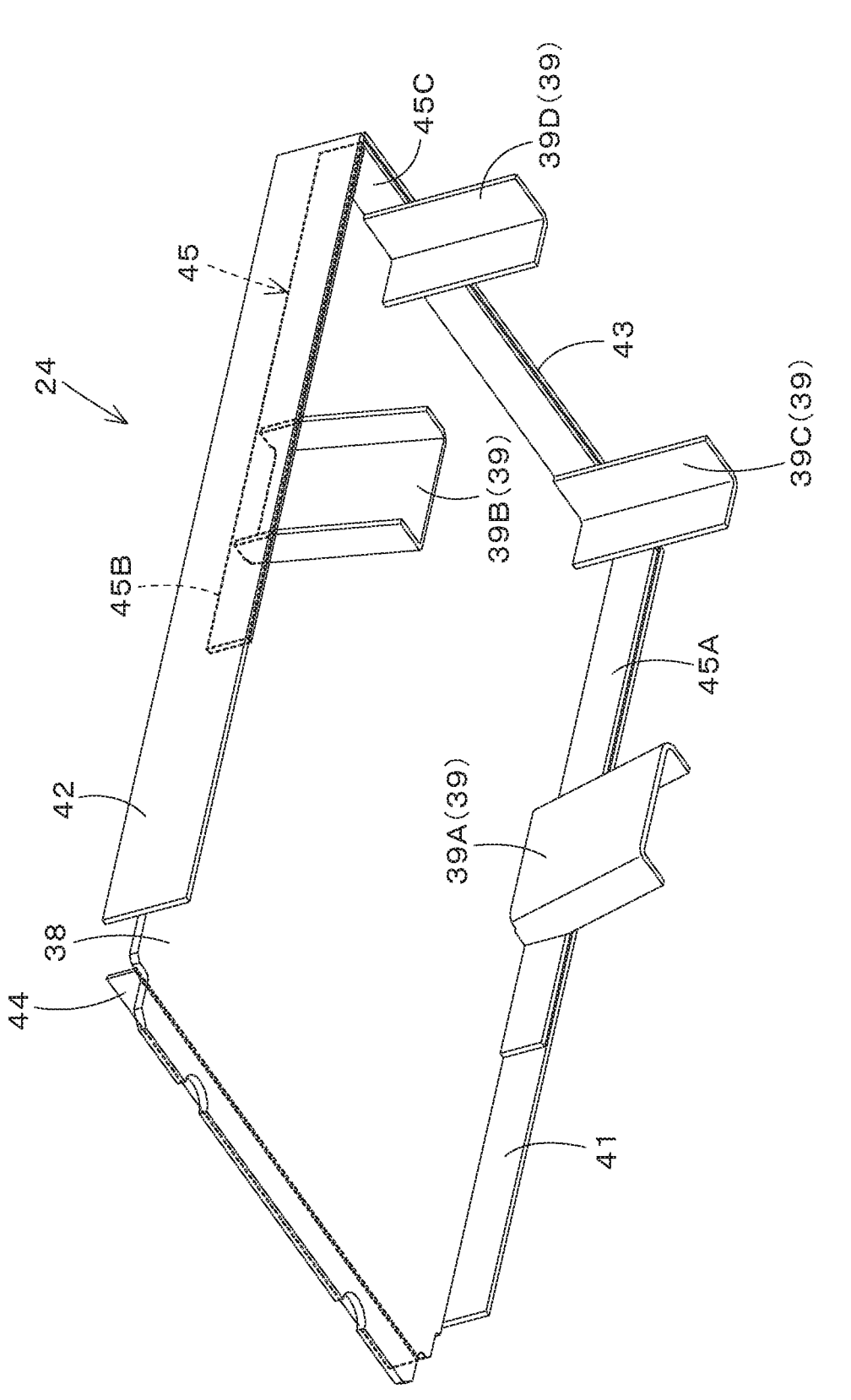
FIG. 9 is a bottom perspective view of a battery support.

As illustrated in FIG. 8 and FIG. 9, the battery support 24 includes a placement plate 38 for placement of the battery 18, and at least one mounting bracket 39 protruding downward from the placement plate 38. As illustrated in FIG. 3, the placement plate 38 is positioned such that plate surfaces thereof face in the up-down direction and is located above the electric motor 4 and the vehicle body frame 8, and a rear portion of the placement plate 38 is placed on the support plate 35. It follows that the rear portion of the placement plate 38 (rear portion of the battery support 24) is supported by the support portion 28. A rear end portion of the placement plate 38 is attached to the support plate 35 with bolt(s) and/or the like.

As illustrated in FIG. 8 and FIG. 9, a first side plate 41 extending in the front-rear direction is fixed to one of the opposite sides of the placement plate 38 in the vehicle width direction, a second side plate 42 extending in the front-rear direction is fixed to the other of the opposite sides of the placement plate 38 in the vehicle width direction, a front plate 43 extending in the vehicle width direction is fixed to a front portion of the placement plate 38, and a rear plate 44 extending in the vehicle width direction is fixed to a rear portion of the placement plate 38. The first side plate 41, the second side plate 42, and the front plate 43 each have a vertical intermediate portion of a plate surface thereof fixed to an edge portion of the placement plate 38, and protrude upward and downward from the placement plate 38. The rear plate 44 is fixed to the upper surface of the placement plate 38. Rearward movement of the battery 18 placed on the placement plate 38 is restricted by the rear plate 44, and the battery 18 is detachably attached to the first side plate 41, the second side plate 42, and the front plate 43 with bolts and/or the like. The battery 18 is also fixed to the restriction portion 32a of the restriction plate 32 on an upper portion of the second pillar member 30 (see FIG. 3) with bolts and/or the like.

As illustrated in FIG. 8 and FIG. 9, there are a plurality of the mounting brackets 39 in the present embodiment, and the mounting brackets 39 are located below the placement plate 38. Specifically, the plurality of mounting brackets 39 include a first bracket 39A located at an intermediate portion in the front-rear direction of the inner side of the first side plate 41, a second bracket 39B located at an intermediate portion in the front-rear direction of the inner side of the second side plate 42, a third bracket 39C located at a left portion of the inner side of the front plate 43, and a fourth bracket 39D located at a right portion of the inner side of the front plate 43. In the present embodiment, the first bracket 39A and the second bracket 39B are made of channel steel, and the third bracket 39C and the fourth bracket 39D are made of angle steel. This does not imply any limitation.

The first bracket 39A to the fourth bracket 39D are attached via a mounting frame 45 to the first side plate 41, the second side plate 42, and the front plate 43. The mounting frame 45 includes a first plate member 45A that is attached to the inner side of the first side plate 41 with bolts and/or the like, a second plate member 45B that is attached to the inner side of the second side plate 42 with bolts and/or the like, and a third plate member 45C that is attached to the inner side of the front plate 43 with bolts and/or the like. The first bracket 39A is fixed to a rear portion of the first plate member 45A, the second bracket 39B is fixed to a rear portion of the second plate member 45B, the third bracket 39C is fixed to a left portion of the third plate member 45C, and the fourth bracket 39D is fixed to a right portion of the third plate member 45C.

As illustrated in FIG. 3 and FIG. 5, the inverter support 25 is located below a front portion of the placement plate 38, is fixed to the vehicle body frame 8, and supports the front portion of the placement plate 38.

Figure 10:
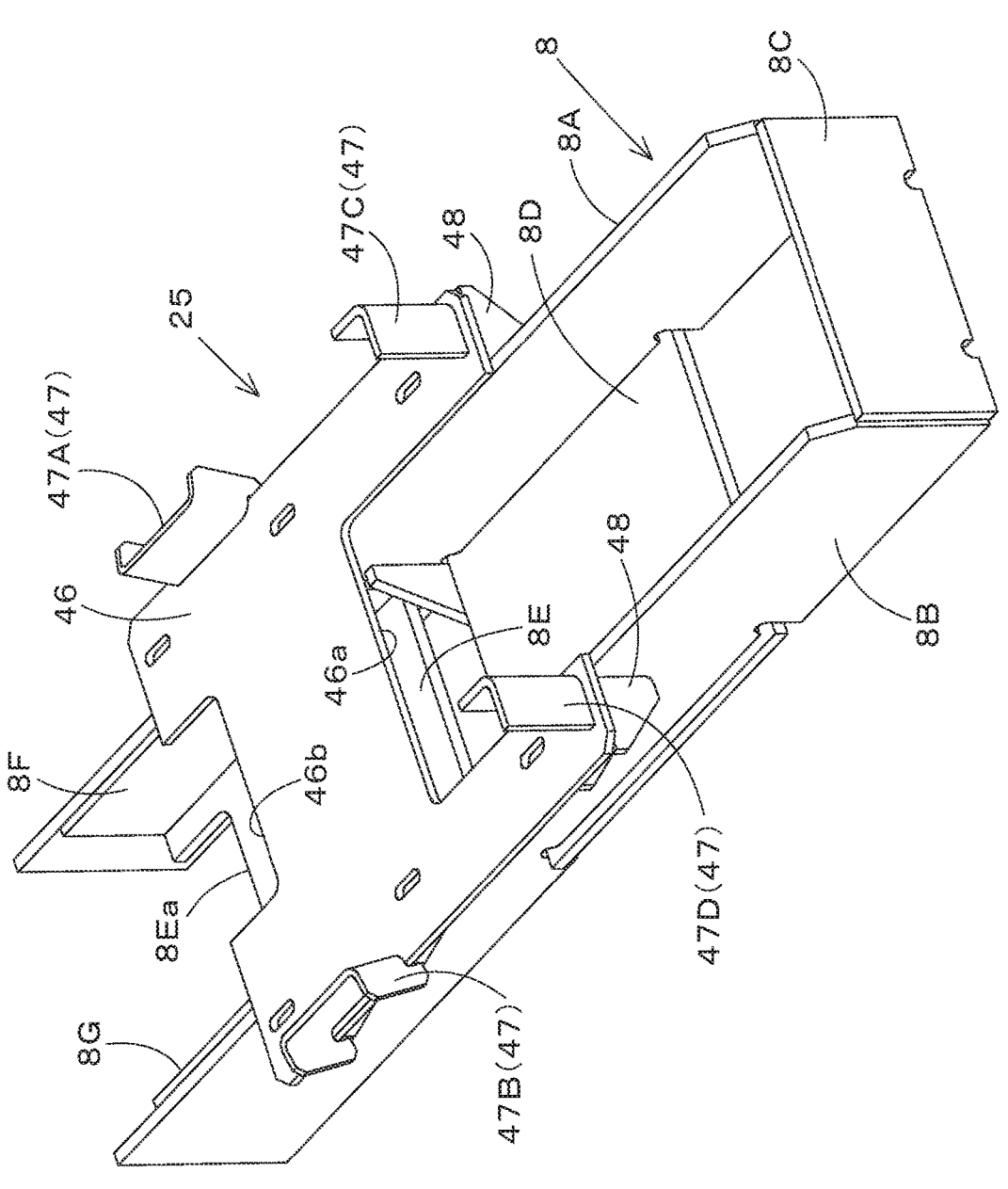
FIG. 10 is a top perspective view of an inverter support.
Figure 11:
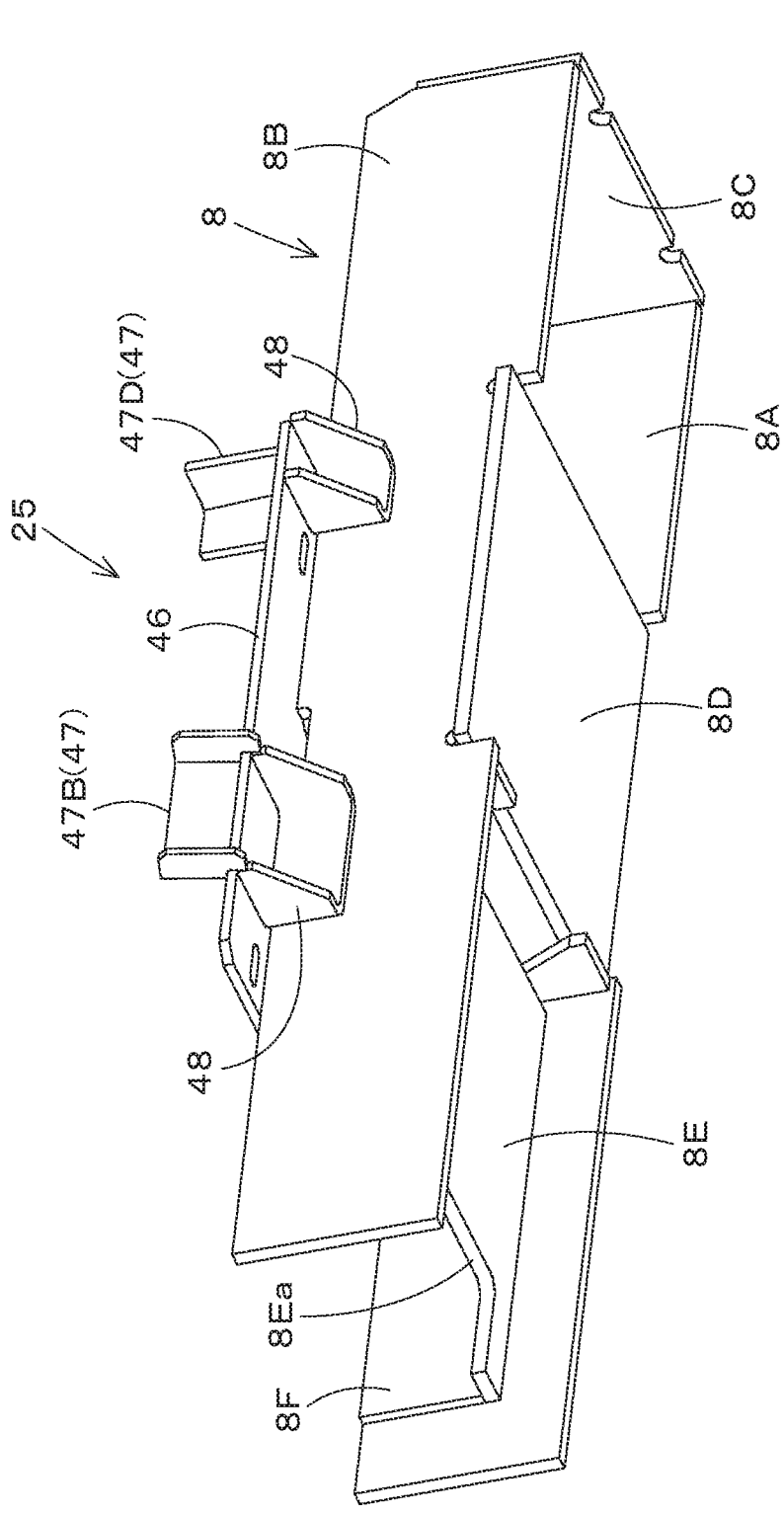
FIG. 11 is a bottom perspective view of an inverter support.

As illustrated in FIG. 10 and FIG. 11, the inverter support 25 includes a supporting plate 46 and at least one supporting stay 47 protruding upward from the supporting plate 46. The supporting plate 46 is located below the placement plate 38 with a space therebetween (see FIG. 3). The supporting plate 46 is positioned such that plate surfaces thereof face in the up-down direction and the supporting plate 46 bridges the gap between the upper end of the first side plate 8A and the upper end of the second side plate 8B. A front portion of the supporting plate 46 has a cutout 46a with an open front. A rear portion of the supporting plate 46 has a cutout 46b with an open rear. A left portion of the supporting plate 46 protrudes leftward from the first side plate 8A. A right portion of the supporting plate 46 protrudes rightward from the second side plate 8B. Mounting tools 48 are fixed to a front portion and a rear portion of the lower surface of the right protruding portion of the supporting plate 46. Similar mounting tools 48 are fixed also to the lower surface of the left protruding portion of the supporting plate 46. The mounting tools 48 at the left portion of the supporting plate 46 are attached to the first side plate 8A with bolts and/or the like, and the mounting tools 48 at the right portion of the supporting plate 46 are attached to the second side plate 8B with bolts and/or the like. The inverter support 25 is thus attached to the vehicle body frame 8.

There are a plurality of the supporting stays 47. The plurality of the supporting stays 47 include a first stay 47A, a second stay 47B, a third stay 47C, and a fourth stay 47D. In the present embodiment, the first stay 47A and the second stay 47B are made of channel steel, and the third stay 47C and the fourth stay 47D are made of angle steel. This does not imply any limitation. The first stay 47A is fixed and positioned at a rear portion of the left portion of the supporting plate 46 such that the first stay 17A corresponds to its corresponding mounting tool 48. The second stay 47B is fixed and positioned at a rear portion of the right portion of the supporting plate 46 such that the second stay 17B corresponds to its corresponding mounting tool 48. The third stay 47C is fixed and positioned at a front portion of the left portion of the supporting plate 46 such that the third stay 47C corresponds to its corresponding mounting tool 48. The fourth stay 47D is fixed and positioned at a front portion of the right portion of the supporting plate 46 such that the fourth stay 47D corresponds to its corresponding mounting tool 48.

The first bracket 39A is attached to the first stay 47A, the second bracket 39B is attached to the second stay 47B, the third bracket 39C is attached to the third stay 47C, and the fourth bracket 39D is attached to the fourth stay 47D (see FIG. 3, FIG. 4, and FIG. 5). It follows that the battery support 24 is attached to the inverter support 25 such that a space in which the inverter 19 can be placed is formed between the placement plate 38 and the supporting plate 46.

The inverter body 19A is placed on the supporting plate 46 and is attached to the supporting plate 46 such that the inverter body 19A is adjustable in position in the front-rear direction. The inverter's connector 19B is provided on the lower surface of a front portion of the inverter 19 to protrude downward from the inverter body 19A, and protrudes downward from the supporting plate 46 (inverter support 25) through the cutout 46a.

Figure 12:
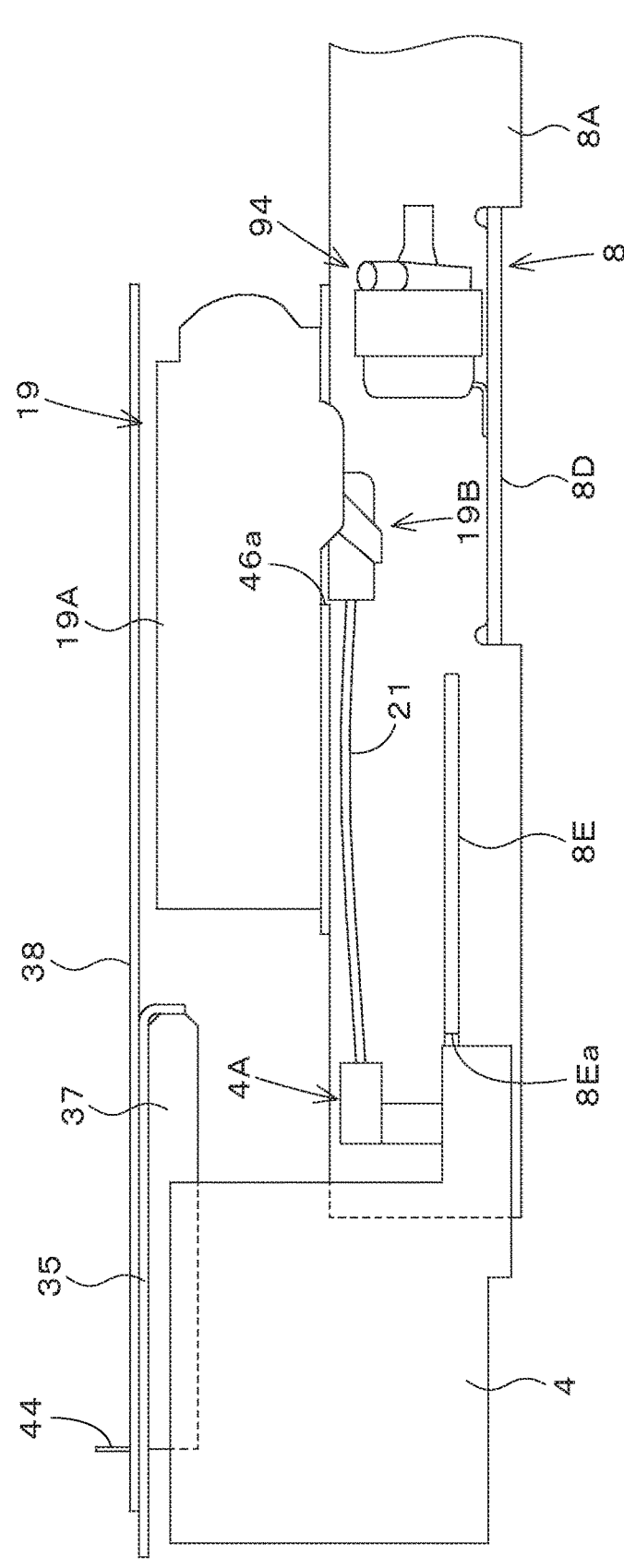
FIG. 12 is a side view illustrating an arrangement relationship between an electric motor and an inverter.

As illustrated in FIG. 3 and FIG. 12, the motor's connector 4A and the inverter's connector 19B are located between the first side plate 8A and the second side plate 8B. With this configuration, the motor's connector 4A, the inverter's connector 19B, and a wire 21 can be protected by the first side plate 8A and the second side plate 8B. Furthermore, the motor's connector 4A, the inverter's connector 19B, and the wire 21 can be prevented from being damaged, and higher reliability can be achieved.

As illustrated in FIG. 12, a wire connection port of the motor's connector 4A is oriented forward, and a wire connection port of the inverter's connector 19B is oriented rearward. In other words, the motor's connector 4A and the inverter's connector 19B face each other in the front-rear direction. Furthermore, the motor's connector 4A and the inverter's connector 19B are arranged to overlap each other when viewed in the front-rear direction. Therefore, the motor's connector 4A and the inverter's connector 19B can be connected by a short path, preventing or reducing generation of heat by the wire 21 and bringing about an improvement in efficiency of a system. Further, since the wire 21 is short, cost reduction can be achieved. Furthermore, since the wire 21 is short and bending of the wire 21 can be minimized, it is possible to reduce the likelihood that the wire 21 will be damaged due to external factors, and possible to achieve improvement in reliability.

As illustrated in FIG. 12, a water pump 94 is attached to the front coupling plate 8D of the vehicle body frame 8. The water pump 94 is a pump that circulates cooling water for cooling the electric motor 4, the inverter 19, a voltage converter (described later), and/or the like.

Figure 13:
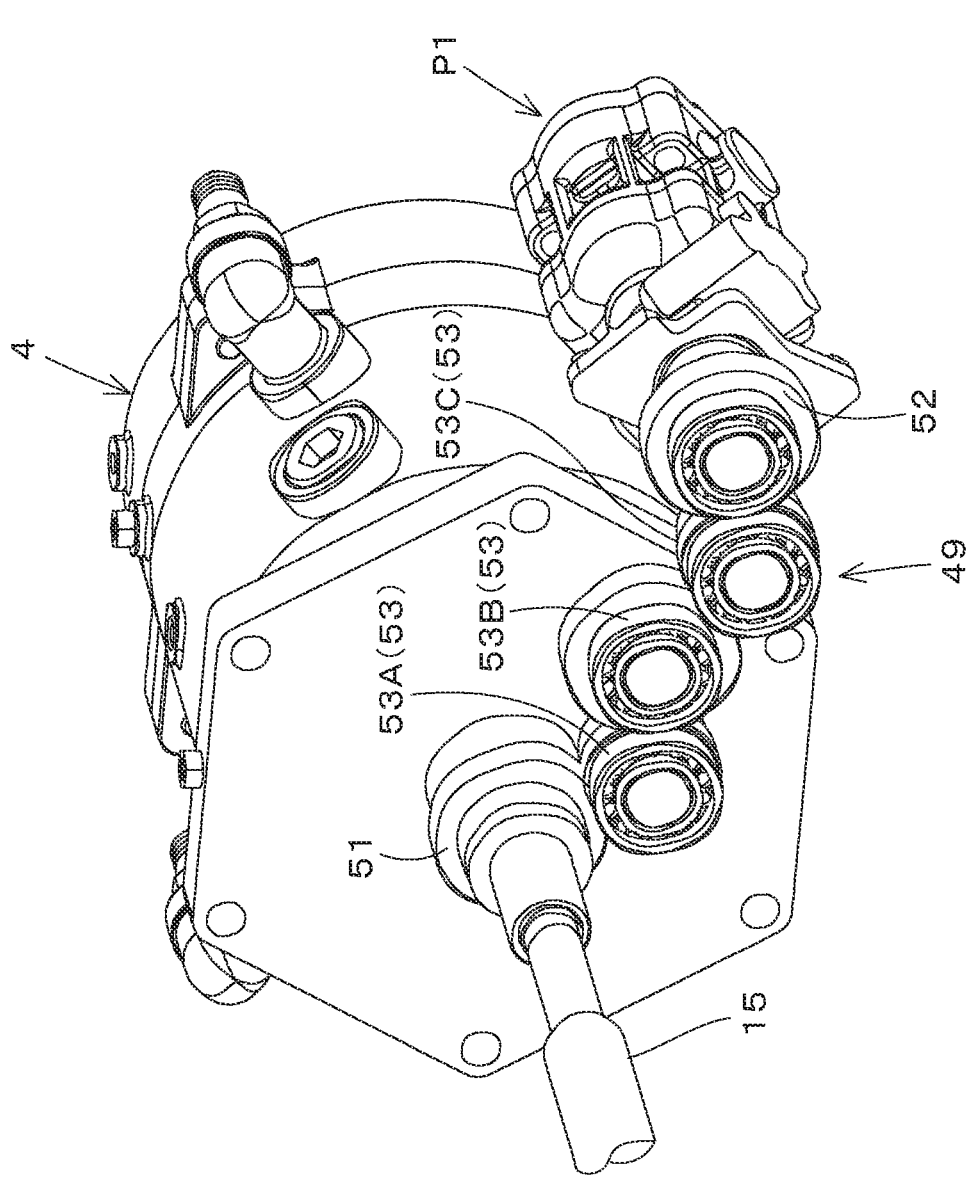
FIG. 13 is a perspective view illustrating a structure that transmits power from an electric motor to a hydraulic pump.

As illustrated in FIG. 3 and FIG. 4, a hydraulic pump P1 that is driven by the electric motor 4 is located on one side of the electric motor 4. The hydraulic pump P1, for example, sucks oil in the inside of the transmission case 9 and supplies the oil as hydraulic fluid to each hydraulic driven actuator. As illustrated in FIG. 13, a power transmitting mechanism 49 is provided behind the electric motor 4 and the hydraulic pump P1, and the power transmitting mechanism 49 transmits power from the electric motor 4 to the hydraulic pump P1. As illustrated in FIG. 4, the power transmitting mechanism 49 is covered by a cover case 61. The cover case 61 has an opening facing forward.

As illustrated in FIG. 13, the power transmitting mechanism 49 includes a gear transmission mechanism. The power transmitting mechanism 49 includes a rotatable output gear 51 that is coupled to an output shaft of the electric motor 4, an input gear 52 that is coupled to an input shaft of the hydraulic pump P1, and one more transmission gears 53 that are located between the output gear 51 and the input gear 52 and transmit power from the output gear 51 to the input gear 52. The output gear 51, the input gear 52, and the transmission gears 53 are each a spur gear and rotate about an axis extending in the front-rear direction. This does not imply any limitation. In the present embodiment, there are a plurality of the transmission gears 53. The plurality of transmission gears 53 include the following three gears: a first gear 53A that meshes with the output gear 51, a second gear 53B that meshes with the first gear 53A, and a third gear 53C that meshes with the second gear 53B and the input gear 52.

Figure 14:
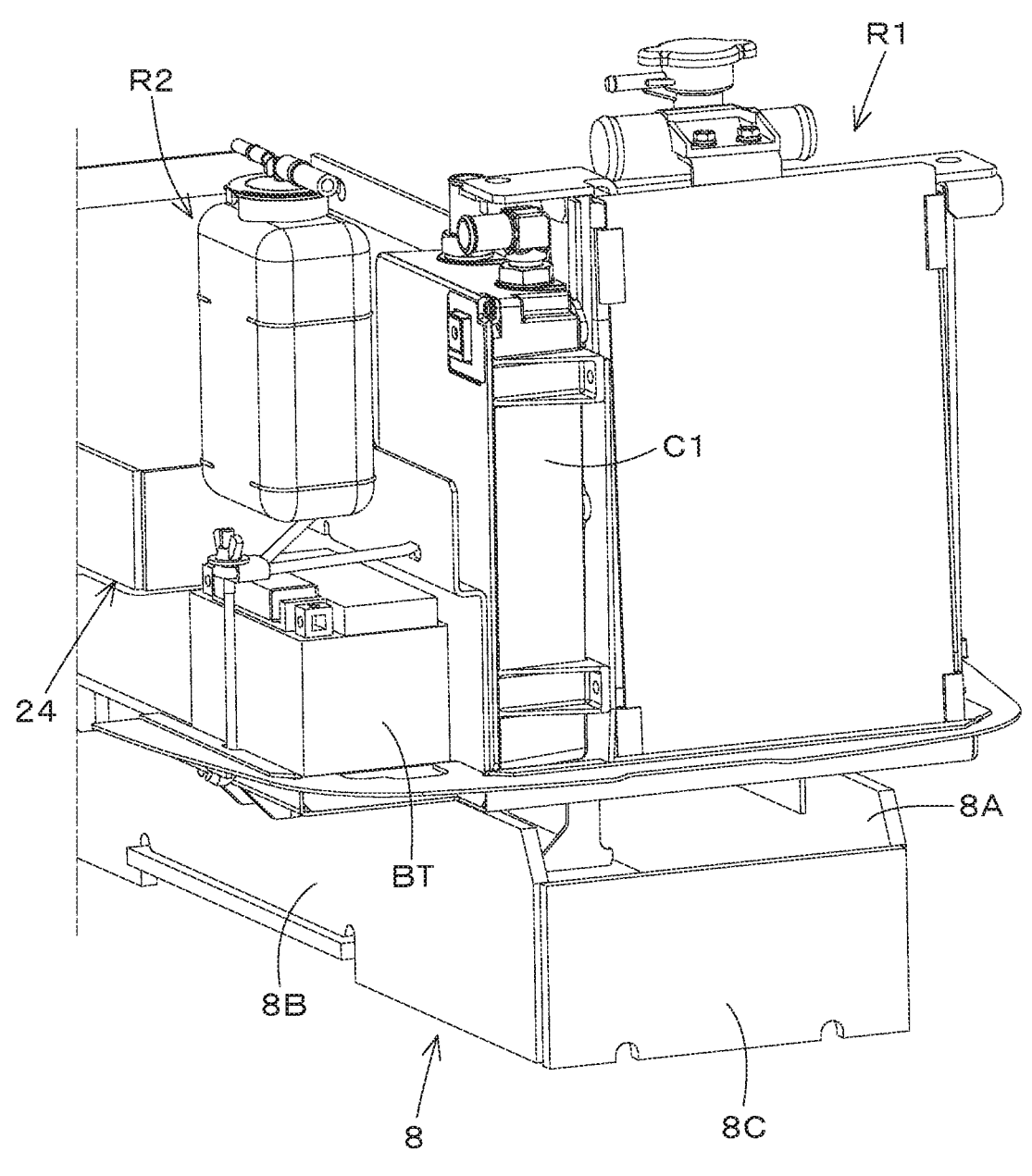
FIG. 14 is a perspective view of mounted components provided at a front portion of a vehicle body frame as viewed from the front right.
Figure 15:
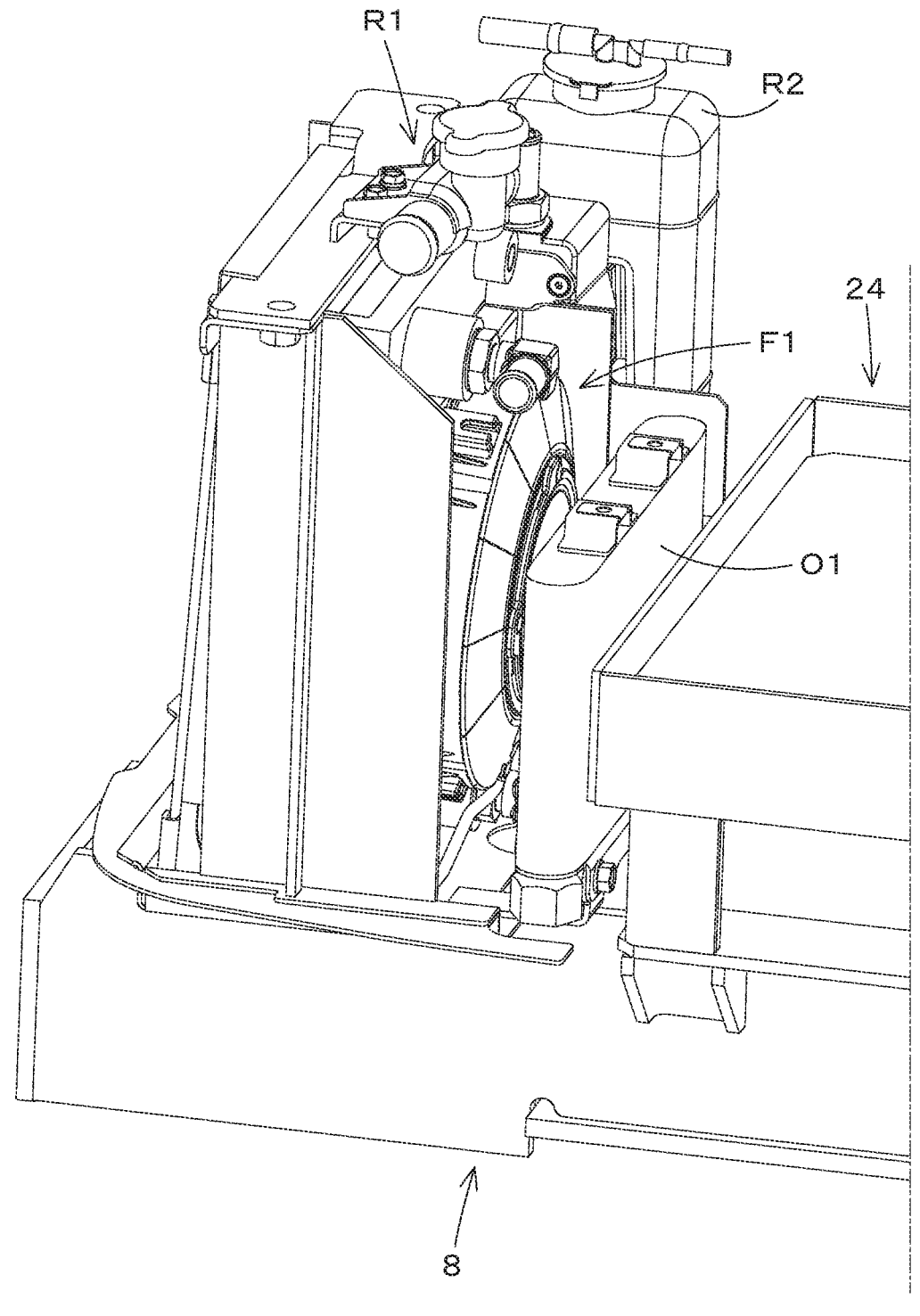
FIG. 15 is a perspective view of mounted components provided at a front portion of a vehicle body frame as viewed from the rear left.

As illustrated in FIG. 14 and FIG. 15, a radiator R1, a voltage converter (DCDC converter) C1, a battery BT for auxiliary machine(s), a reserve tank R2, a cooling fan F1, an oil cooler O1, and/or the like are located forward of the battery support 24 and attached to and supported on a front portion of the vehicle body frame 8.

As illustrated in FIG. 14, the radiator R1, the voltage converter C1, and the battery BT for auxiliary machine(s) are arranged in this order from the left in the vehicle width direction. The reserve tank R2 is located above the battery BT for auxiliary machine(s). As illustrated in FIG. 15, the cooling fan F1 is located rearward of the radiator R1, and the oil cooler O1 is located rearward of the cooling fan F1.

The radiator R1 is a heat dissipater that cools, with cooling air generated by the cooling fan F1, cooling water circulated by the water pump 94. The voltage converter C1 is a device that steps down electric power sent from the battery 18 and supplies the electric power to the battery BT for auxiliary machine(s). The battery BT for auxiliary machine(s) is a storage battery that supplies electric power to controller(s) that controls electrical machines such as the cooling fan F1, the inverter 19, and the electric motor 4, and to electrical device(s) such as lamp(s). The reserve tank R2 is a tank for storing cooling water that escapes from the radiator R1 when temperature is high. The oil cooler O1 is a heat dissipater that cools, with cooling air generated by the cooling fan F1, hydraulic fluid for actuating hydraulic device(s) and/or the like.

Figure 16:
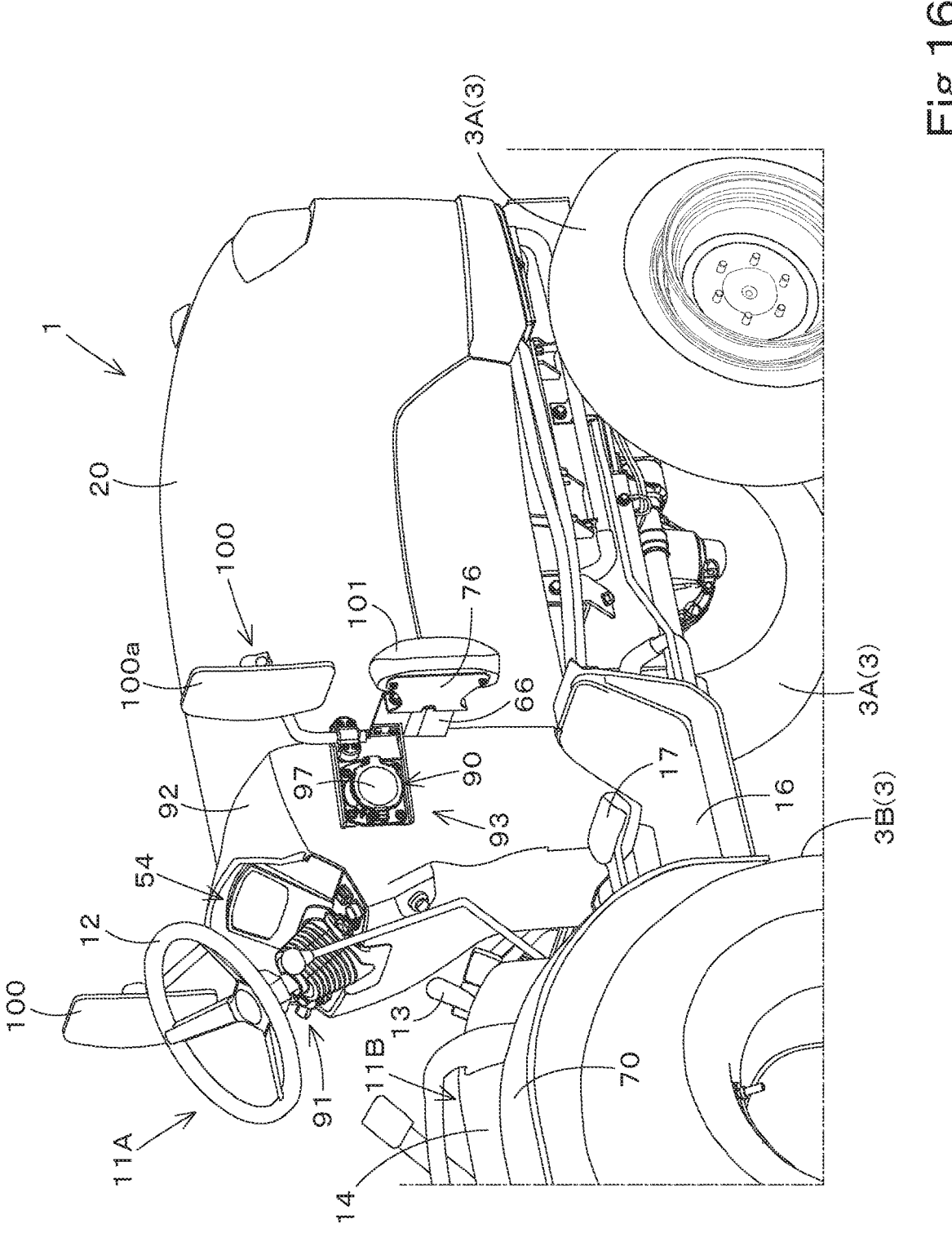
FIG. 16 is a perspective view of a front portion of an operator portion as viewed from the rear right.
Figure 17:
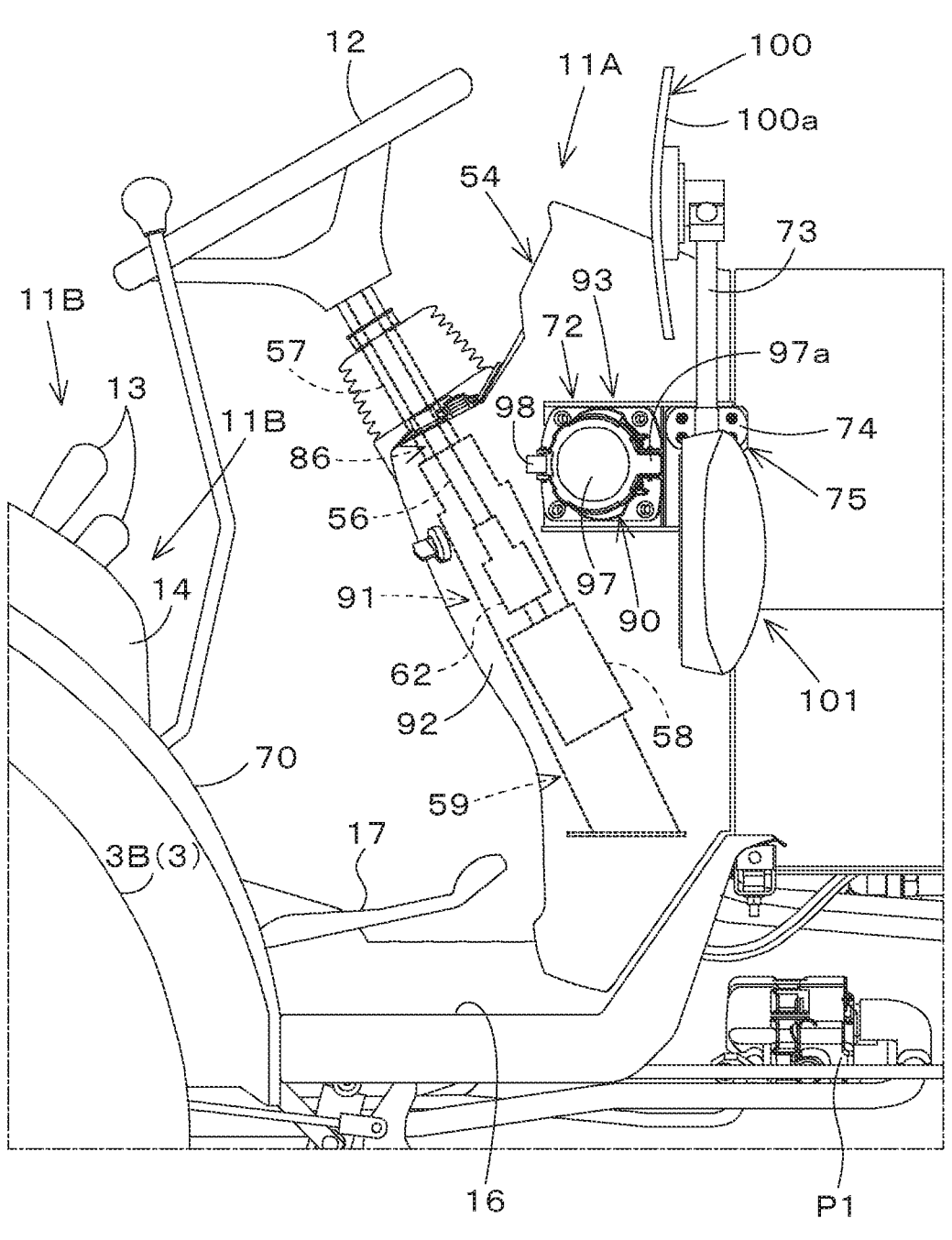
FIG. 17 is a side view of a front portion of an operator portion.

As illustrated in FIG. 16 to FIG. 19, the front steering portion 11A of the operator portion 10 includes a charging connector 90 for charging the battery 18. As illustrated in FIG. 17, the front steering portion 11A includes a steering operation device 91 including the steering handle 12, and a front cover (cover body) 92 that covers a lower portion of the steering operation device 91. The front cover 92 (front steering portion 11A) is located upward of the vehicle body 2 and mounted on the vehicle body. In other words, the front cover 92 extends upward from the vehicle body 2. The front cover 92 protrudes upward from the floor 16. The steering handle 12 is located at an upper portion of the rear surface of the front cover 92. An upper portion of the front cover 92 is provided with an instrument panel 54 including a monitor, meters, switches, and/or the like. The instrument panel 54 is provided with a battery level meter that indicates the amount of charge in the battery 18. The front cover 92 is located rearward of and near the hood 20 and has an opening facing forward. The rear end of the hood 20 has an opening facing rearward. It follows that the front cover 92 and the hood 20 are in communication with each other. The rear frame 23 (main frame 26) of the support frame 22 is located at a rear end portion of the hood 20, and the mounting plates 33 provided on the rear frame 23 are configured to be inserted into the front cover 92.

As illustrated in FIG. 17, the steering operation device 91 includes: a steering operation member (operation member) 86 including the steering handle 12 and a steering shaft 56; a steering post 57 that supports the steering shaft 56; a steering valve 58 that is connected to the steering shaft 56 via a universal joint 62; and a frame member 59 that supports the steering post 57, the steering valve 58, and the like. The front cover 92 thus covers a lower portion of the steering operation member 86. The frame member 59 is attached to and supported by a member that is attached on the vehicle body 2 side, such as the rear frame 23.

In the aforementioned steering operation device 91, when the steering handle 12 is rotationally operated, the steering valve 58 is operated via the steering shaft 56 and the universal joint 62, and the steering valve 58 supplies hydraulic fluid supplied from the hydraulic pump P1 to a steering cylinder (not illustrated) that steers the front wheels 3A.

Figure 19:
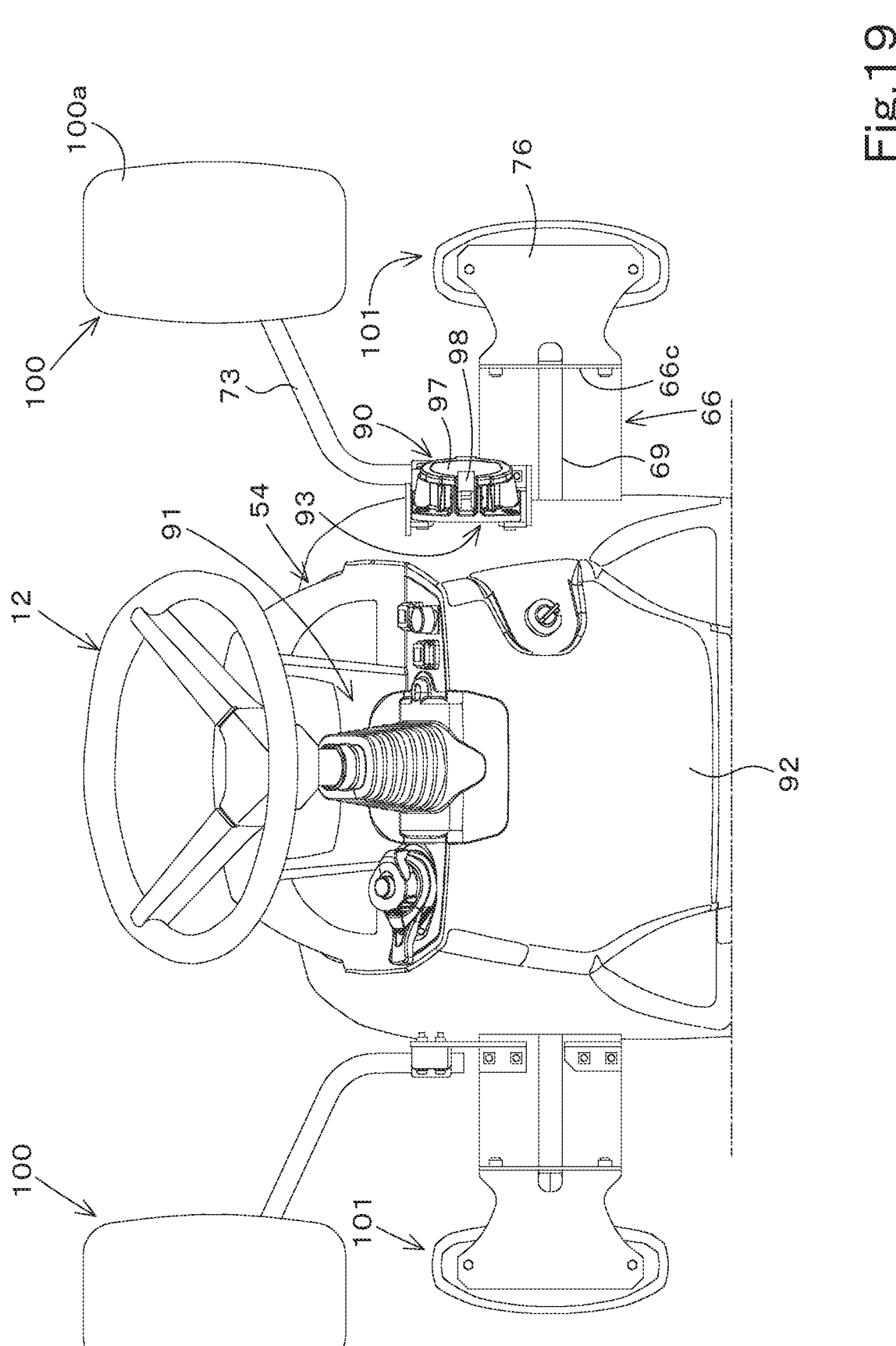
FIG. 19 is a back view of a front portion of an operator portion.

As illustrated in FIG. 16 and FIG. 19, the charging connector 90 is located outside (or at the outer surface of) the front cover 92 (cover body) and exposed outward of the front cover 92 (front steering portion 11A). Furthermore, the charging connector 90 is located at a side (right side) of the front cover 92 such that the charging connector 90 is oriented in the outward widthwise direction (rightward). Further, as illustrated in FIG. 17, the charging connector 90 is located forward of and below the steering handle 12. Furthermore, as illustrated in FIG. 1, the charging connector 90 is located at an upper portion of the outer surface of the front cover 92 such that the height position thereof is substantially the same as the height position of the seat portion 6A of the operator's seat 6. The right side of the front cover 92 is open to allow a foot to be placed on the portion of the floor 16 that is below the charging connector 90 to perform charging. A passage space is formed between the front cover 92 and the fenders 7.

Figure 18:
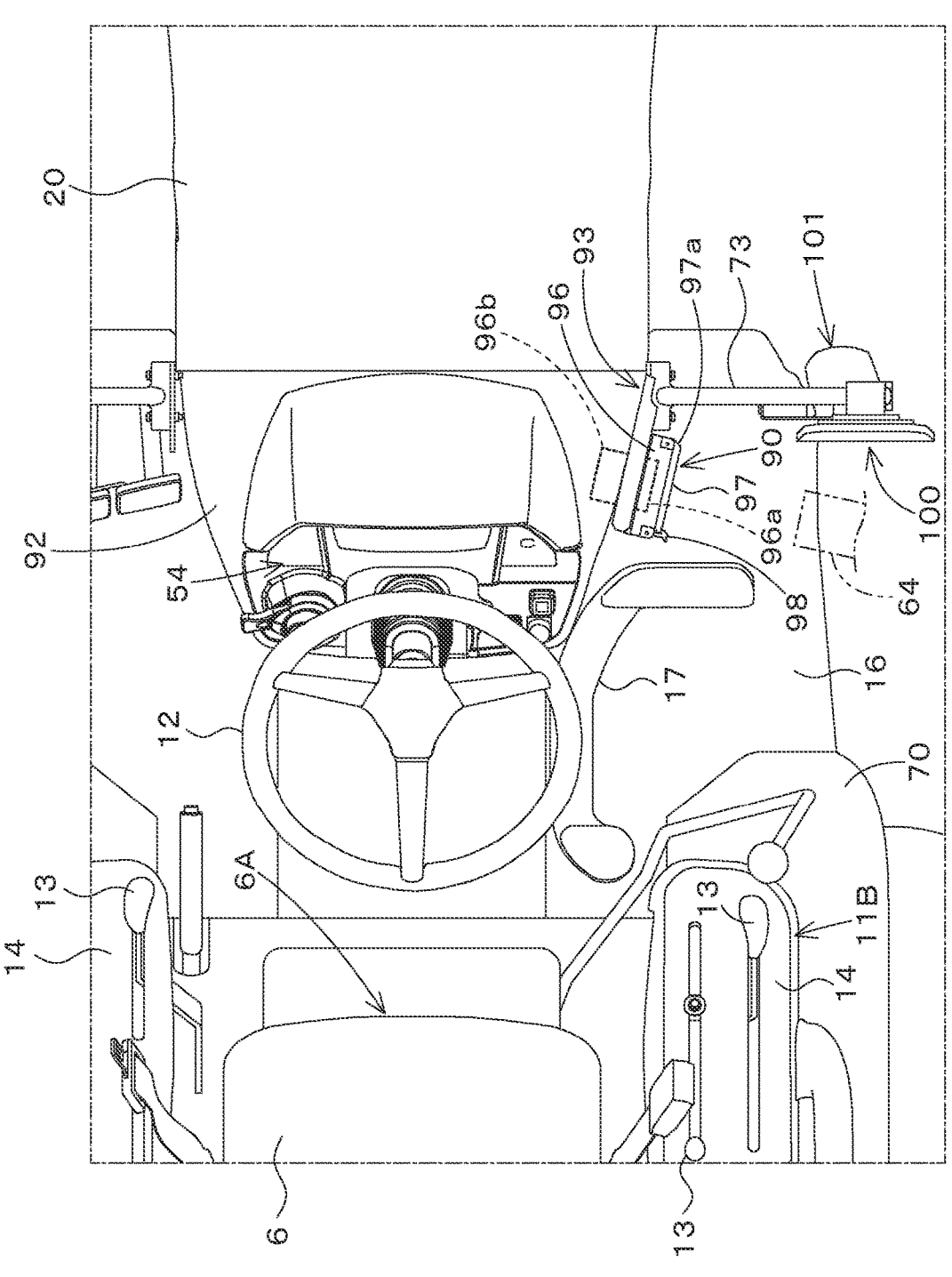
FIG. 18 is a plan view of a front portion of an operator portion.

As illustrated in FIG. 18, the charging connector 90 includes: a connector body 96 including a connection terminal portion 96a; a cap 97 that openably closes the connection terminal portion 96a side of the connector body 96; and a wire terminal portion 96b.

The connection terminal portion 96a is a portion to which a power supplying connector 64 is connected. The power supplying connector 64 is provided at, for example, an external power supply system such as a charging system in a charging facility called a charging stand or a charging station or in a house.

The connector body 96 is located outward in the outward widthwise direction (rightward) of the steering handle 12 and located outward of the operator's seat 6 in the outward widthwise direction.

As illustrated in FIG. 17, the cap 97 is attached to the connector body 96 such that a pivotal support portion 97a provided at a front portion of the cap 97 is rotatable about a vertical axis (an axis extending in the up-down direction). A locking member 98 that detachably engages the cap 97 and restricts opening movement of the cap 97 is provided rearward of the cap 97. The locking member 98 is pivotally supported on the connector body 96 and capable of removing the restriction of the opening movement of the cap 97 by being rotated about the vertical axis. It is possible to cause the connection terminal portion 96a of the connector body 96 to be exposed outward in the vehicle width direction by opening (rotating) the cap 97 toward the front about the vertical axis.

As illustrated in FIG. 18, the wire terminal portion 96b protrudes from the back surface of the connector body 96 and is inserted in the front cover 92. The wire terminal portion 96b is a portion for connection with a connection wire that connects the charging connector 90 and the battery 18. When the power supplying connector 64 of an external power source is connected to the connection terminal portion 96a, the battery 18 charged with electricity from the wire terminal portion 96b through the connection wire.

As illustrated in FIG. 16 and FIG. 17, an indicator lamp 101 and a side mirror 100 are located forward of the charging connector 90. The indicator lamp 101 is, for example, a combination lamp including a combination of a plurality of lamps. The lamps included in the combination lamp are position lamp(s), winker lamp(s), hazard lamp(s), and/or the like. The side mirror 100 is a mirror to visually check an area rearward of the vehicle body 2. The indicator lamp 101 and a mirror body 100a of the side mirror 100 are located at a position forward of the charging connector 90 and outward of the charging connector 90 in the outward widthwise direction.

Figure 20:
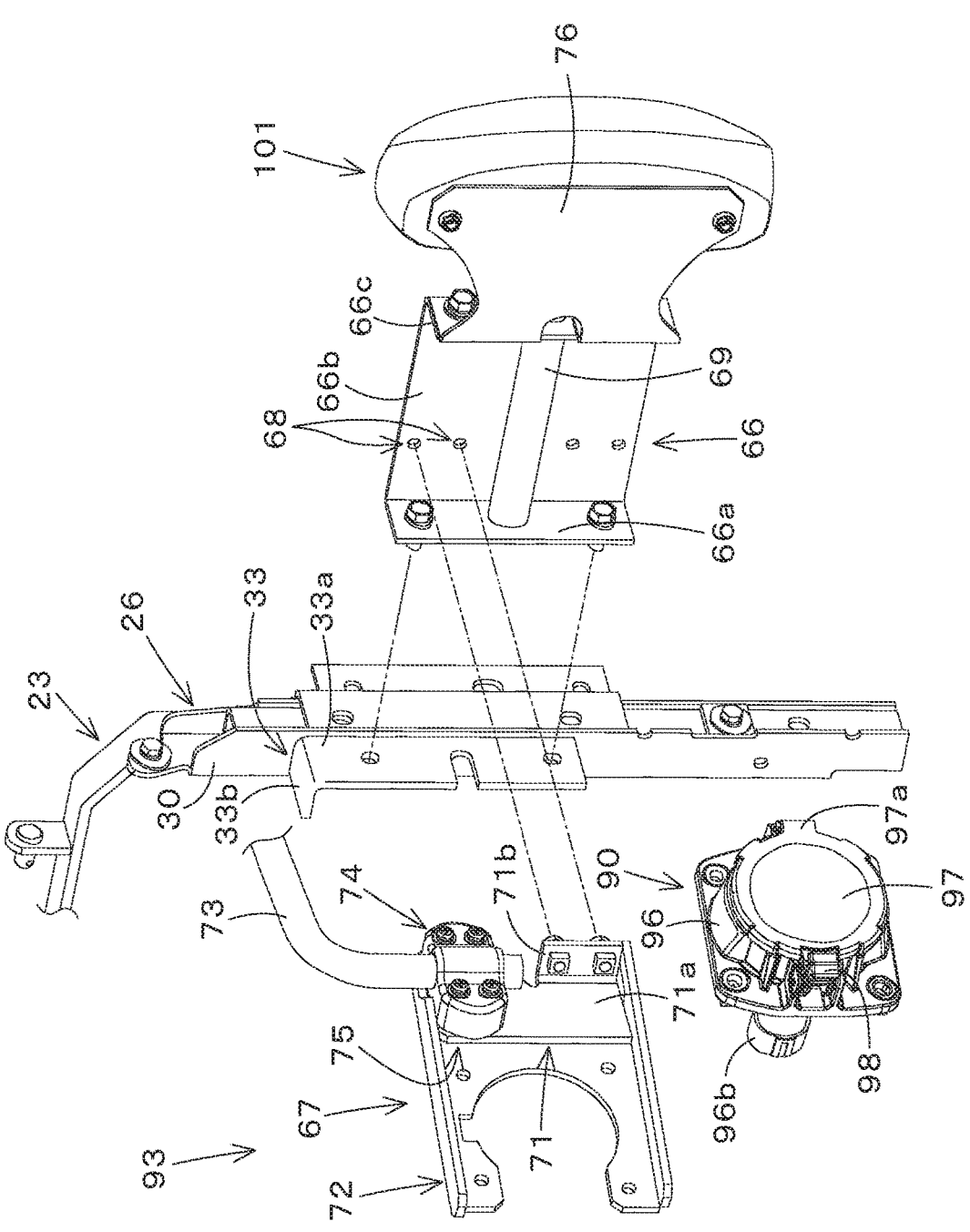
FIG. 20 is an exploded perspective view illustrating a mounting structure for a charging connector.

As illustrated in FIG. 19, the charging connector 90 is attached to a connector bracket 93. As illustrated in FIG. 20, the connector bracket 93 includes a first bracket member 66 and a second bracket member 67. The first bracket member 66 includes: a mounting wall portion 66a that is placed on and attached to the vertical plate portion 33a of one of the mounting plates (mounting portion) 33 provided on the rear frame 23; an extension wall portion 66b extending in the outward widthwise direction from the front edge of the mounting wall portion 66a; a lamp mounting portion 66c extending rearward from the distal edge (an edge portion located on outer one of the opposite sides in the vehicle width direction) of the extension wall portion 66b; and a reinforcement member 69 including a pipe member and/or the like coupling the mounting wall portion 66a and the lamp mounting portion 66c to each other. The extension wall portion 66b protrudes in the outward widthwise direction from the inner side of the front cover 92 and has at least one mounting hole 68 at the protruding portion of the extension wall portion 66b.

The second bracket member 67 includes a first member 71 attached to the first bracket member 66, and a second member 72 fixed to the first member 71. The first member 71 includes a first wall portion 71a arranged such that plate surfaces thereof face in the vehicle width direction, and a second wall portion 71b extending in the outward widthwise direction from a lower portion of the front edge of the first wall portion 71a and attached to the portion of the extension wall portion 66b that has the mounting hole(s) 68. The second member 72 is fixed such that the second member 72 protrudes rearward from the first wall portion 71a of the first member 71. In the present embodiment, the second member 72 extends such that the second member 72 is inclined outward in the vehicle width direction (inclined leftward) with decreasing distance to the rear. The charging connector 90 is attached to the second member 72 from the outer side in the vehicle width direction. In other words, the second member 72 is a connector mounting portion to which the charging connector 90 is attached.

As described above, the connector bracket 93 includes the connector mounting portion (second member 72) to which the charging connector 90 is attached outside the front cover 92, and the mounting wall portion 66a attached to the mounting portion (mounting plate 33) provided inside the front cover 92.

As illustrated in FIG. 20, a pillar member 73 for the side mirror 100 is attached to an upper portion of the first member 71 of the second bracket member 67 via a mounting tool 74. The upper portion of the first member 71 thus functions as a mirror mounting portion 75 to which the side mirror 100 is attached. A lamp stay 76 for the indicator lamp 101 is attached to the lamp mounting portion 66c of the first bracket member 66.

As described above, the connector bracket 93 includes the mirror mounting portion 75 to which the side mirror 100 is attached, and the lamp mounting portion 66c to which the indicator lamp 101 is attached.

The charging connector 90 can be located outside (or at the outer surface of) the cover body 14 of one of the side steering portion(s) 11B. In other words, the cover body provided in the vicinity of the operator's seat 6 and covering a lower portion of the operation member is provided with the charging connector 90.

An electric tractor 1 as has been discussed includes an electric motor 4 to drive a traveling device 3, a battery 18, an inverter 19 to supply electric power from the battery 18 to the electric motor 4, a vehicle body frame 8 located below a hood 20 located forward of an operator's seat 6 to cover the battery 18, and a support frame 22 attached to the vehicle body frame 8, wherein the support frame 22 includes a battery support 24 to support the battery 18 located at a position above the electric motor 4 and above the vehicle body frame 8, and an inverter support 25 to support the inverter 19 located at a position between the battery support 24 and the vehicle body frame 8 and forward of the electric motor 4.

This configuration includes the battery support 24 which supports the battery 18 located at a position above the electric motor 4 and above the vehicle body frame 8, and the inverter support 25 which supports the inverter 19 located at a position between the battery support 24 and the vehicle body frame 8 and forward of the electric motor 4. It is thus possible to place the electric motor 4 and the inverter 19 at positions close to each other and possible to couple the electric motor 4 and the inverter 19 by a short path.

The battery support 24 may include a placement plate 38 for placement of the battery 18, and a mounting bracket 39 protruding downward from the placement plate 38. The inverter support 25 may include a supporting plate 46 for placement of the inverter 19, the supporting plate 46 being located below the placement plate 38 with a space interposed between the supporting plate 46 and the placement plate 38 and being attached to the vehicle body frame 8, and a support stay 47 which protrudes upward from the supporting plate 46 and to which the mounting bracket 39 is attached.

With this configuration, a space in which the inverter 19 is placed can be formed at a position below the battery 18 and forward of the electric motor 4.

The inverter support 25 may support the inverter 19 such that the inverter 19 is positioned to overlap the electric motor 4 when viewed in a front-rear direction.

With this configuration, the electric motor 4 and the inverter 19 can be arranged compactly.

The support frame 22 may include a support portion 28 located below a rear portion of the placement plate 38, the support portion 28 being fixed to the vehicle body frame 8 to support the rear portion of the placement plate 38. The inverter support 25 supports a front portion of the placement plate 38.

With this configuration, the battery 18 can be sufficiently supported by the support portion 28 and the inverter support 25.

The support portion 28 may include a support plate 35 for placement of the rear portion of the placement plate 38, the support plate 35 being located above the electric motor 4, and a support leg 36 provided on the same side of the support plate 35 as a lower surface of the support plate 35 and fixed to the vehicle body frame 8.

Since the support plate 35 is located above the electric motor 4, the support portion 28 and the electric motor 4 can be arranged compactly.

The electric motor 4 may include a motor's connector 4A provided on a front portion of the electric motor 4. The inverter 19 may include an inverter's connecter 19B connected to the motor's connecter 4A, the inverter's connector 19B being located forward of the motor's connector 4A.

With this configuration, the motor's connector 4A and the inverter's connector 19B can be connected to each other through a short path.

The motor's connector 4A may be provided on a front lower portion of the electric motor 4. The inverter 19 may be positioned such that an inverter body 19A thereof placed and supported on the inverter support 25 is located forward of an upper portion of the electric motor 4 and the inverter body 19A overlaps the upper portion of the electric motor 4 when viewed in a front-rear direction. The inverter's connector 19B may be provided on a lower portion of the inverter body 19A and protrudes downward from the inverter support 25.

Also with this configuration, the motor's connector 4A and the inverter's connector 19B can be connected to each other through a shorter path.

The inverter support 25 may have a cutout 46a that allows the inverter's connector 19B to protrude downward from the inverter support 25.

This configuration makes it possible to allow the inverter's connector 19B to protrude downward from the inverter support 25 while supporting the inverter 19 favorably on the inverter support 25.

The vehicle body frame 8 may include a first side plate 8A and a second side plate 8B that are arranged with a space therebetween in a vehicle width direction. The motor's connector 4A and the inverter's connector 19B may be located between the first side plate 8A and the second side plate 8B.

With this configuration, the motor's connector 4A and the inverter's connector 19B can be protected.

An electric tractor 1 includes an operator portion 10 including an operator's seat 6 and a steering portion (front steering portion 11A) provided in the vicinity of the operator's seat 6, a vehicle body 2 on which the operator portion 10 is provided, a traveling device 3 to support the vehicle body 2 such that the traveling device 3 is allowed to travel, an electric motor 4 to drive the traveling device 3, a battery 18 to supply electric power to the electric motor 4, and a charging connector 90 for charging of the battery 18, wherein the steering portion 11A includes an operation member (steering operation member 86) and a cover body 92 (front cover 92) to cover a lower portion of the operation member 86, and the charging connector 90 is located outside the cover body 92 to be exposed outward of the steering portion.

With this configuration, the battery 18 can be charged easily.

The charging connector 90 may be located at a side of the cover body 92 such that the charging connector 90 is oriented outward in a vehicle width direction.

With this configuration, the battery 18 can be charged more easily.

The steering portion 11A may include a steering operation member 86 that is located forward of the operator's seat 6 to function as the operation member, and a front cover 92 that covers a lower portion of the steering operation member 86 to function as the cover body. The charging connector 90 may be located on an upper portion of an outer surface of the front cover 92.

With this configuration, the charging connector 90 can be positioned such that a power supplying connector of an external power source is easily connected to the charging connector 90.

The steering operation member 86 may include a steering handle 12. The charging connector 90 is located forward of the steering handle 12.

This configuration makes it possible to eliminate or reduce the likelihood that the steering handle 12 will prevent a connector of an external power source from being connected to the charging connector 90.

The charging connector 90 may be located on the outer surface of the front cover such that a height position of the charging connector 90 is substantially the same as a height position of a seat portion 6A of the operator's seat 6.

Also with this configuration, the charging connector 90 can be positioned such that a power supplying connector of an external power source is easily connected to the charging connector 90.

The electric tractor 1 may include a connector bracket 93 to which the charging connector 90 is attached. The connector bracket 93 may include a connector mounting portion (second member 72) to which the charging connector 90 is attached outside the front cover 92, and a mounting wall portion 66a attached to a mounting portion (mounting plate 33) provided inside the front cover 92.

With this configuration, the connector bracket 93 can be sufficiently supported, and the charging connector 90 can be easily attached.

The connector bracket 93 may include a mirror mounting portion 75 to which a side mirror 100 is attached.

With this configuration, a member functions as two or more members, making it possible to reduce cost.

The connector bracket 93 may include a lamp mounting portion 66c to which an indicator lamp 101 is attached.

Also with this configuration, a member functions as two or more members, making it possible to reduce cost.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric tractor comprising:
   an operator portion including an operator's seat and a steering portion provided in the vicinity of the operator's seat;
   a vehicle body on which the operator portion is provided;
   a traveling device to support the vehicle body such that the traveling device is allowed to travel;
   an electric motor to drive the traveling device;
   a battery to supply electric power to the electric motor;
   a hood to cover the battery; and
   a charging connector for charging of the battery, wherein
   the steering portion includes an operation member including a steering handle and a cover body located rearward of the hood to cover a lower portion of the operation member,
   the steering handle is located at an upper portion of a rear surface of the cover body and is forward of the operator's seat,
   the charging connector is located outside the cover body to be exposed outward of the steering portion and includes a connector body including a connection terminal portion which is a portion to which a power supplying connector is connected, the connector body being located at a side of the cover body such that the connection terminal portion is oriented outward in a vehicle width direction of the electric tractor; and the connector body is located between the steering handle and the hood, and is located at an outer surface of the cover body that faces outward in the vehicle width direction such that the connector body is located outward in the vehicle width direction of an outermost portion of the steering handle in the vehicle width direction.

2. The electric tractor according to claim 1, wherein the steering portion includes a steering operation member that is located forward of the operator's seat to function as the operation member, and a front cover that covers a lower portion of the steering operation member to function as the cover body, and the charging connector is located on an upper portion of an outer surface of the front cover.

3. The electric tractor according to claim 2, wherein the steering operation member includes a steering handle, and the charging connector is located forward of the steering handle.

4. The electric tractor according to claim 2, wherein the charging connector is located on the outer surface of the front cover such that a height position of the charging connector is substantially the same as a height position of a seat portion of the operator's seat.

5. An electric tractor comprising:

an operator portion including an operator's seat and a steering portion provided in the vicinity of the operator's seat;

a vehicle body on which the operator portion is provided;

a traveling device to support the vehicle body such that the traveling device is allowed to travel;

an electric motor to drive the traveling device;

a battery to supply electric power to the electric motor;

a charging connector for charging of the battery; and a connector bracket to which the charging connector is attached, wherein the steering portion includes an operation member and a cover body to cover a lower portion of the operation member, the charging connector is located outside the cover body to be exposed outward of the steering portion, and the connector bracket includes a connector mounting portion to which the charging connector is attached outside a front cover that function as the cover body, and a mounting wall portion attached to a mounting portion provided inside of the front cover.

6. The electric tractor according to claim 5, wherein the connector bracket includes a mirror mounting portion to which a side mirror is attached.

7. The electric tractor according to claim 5, wherein the connector bracket includes a lamp mounting portion to which an indicator lamp is attached.

* * * * *